United States Patent [19]
Van Kleeck

[11] Patent Number: 6,008,799
[45] Date of Patent: Dec. 28, 1999

[54] METHOD AND SYSTEM FOR ENTERING DATA USING AN IMPROVED ON-SCREEN KEYBOARD

[75] Inventor: Michael Van Kleeck, Duvall, Wash.

[73] Assignee: Microsoft Corporation, Redmond, Wash.

[21] Appl. No.: 08/248,352

[22] Filed: May 24, 1994

[51] Int. Cl.⁶ .................................................... G09G 5/00
[52] U.S. Cl. .......................................... 345/173; 345/156
[58] Field of Search .................................... 345/173, 163, 345/145, 156, 157, 168, 169–172; 341/20, 23, 28; 364/706; 704/2, 4, 10

[56] References Cited

U.S. PATENT DOCUMENTS

| | | | |
|---|---|---|---|
| 4,586,035 | 4/1986 | Baker et al. | 345/157 |
| 4,624,587 | 11/1986 | Ueno et al. | 345/145 X |
| 4,891,786 | 1/1990 | Goldwasser | 341/29 |
| 4,905,007 | 2/1990 | Rohm | 345/168 X |
| 5,063,600 | 11/1991 | Norwood | 345/173 |
| 5,128,672 | 7/1992 | Kaehler | 345/168 |
| 5,297,041 | 3/1994 | Kushler et al. | 431/28 |
| 5,319,386 | 6/1994 | Gunn et al. | 345/173 |
| 5,574,482 | 11/1996 | Niemeier | 345/168 |
| 5,583,543 | 12/1996 | Takahashi et al. | 345/173 |

FOREIGN PATENT DOCUMENTS

WO 92/09944  6/1992  WIPO.

OTHER PUBLICATIONS

"DynaSyms 2000" Manual & User's Handbook Version 2.0, by Faith Carlson, 1992.

"Mastering WordPerfect 5.1 & 5.2 for Windows" by Alan Simpson P 367–369, P 379–382, P 933–934, 1993.

Noyes, "The QWERTY keyboard: a review," *Int. J. Man–Machine Studies* 18:265–281, 1983.

Cumming, "QWERTY and keyboard reform: the soft keyboard option," *Int. J. Man–Machine Studies* 21:445–450, 1984.

Beaumont, "Speed of response using keyboard and screen–based microcomputer response media," *Int. J. Man–Machine Studies* 23:61–70, 1985.

Pollatschek et al., "The customizable keyboard," *Behavior and Information Technology* 5:283–287, 1986.

Gilad et al., "Layout simulation for keyboards," *Behavior and Information Technology* 5:273–281, 1986.

Potosnak, *Handbook of Human–Computer Interaction*, Elsevier Science Publishers B.V., North Holland, 1988, pp. 475–494.

Marmaras et al., *Human–Computer Interaction—INTERACT '90*, Elsevier Science Publishers B.V., North Holland, 1990, pp. 707–712.

(List continued on next page.)

*Primary Examiner*—Amare Mengistu
*Attorney, Agent, or Firm*—Christensen O'Connor Johnson & Kindness PLLC

[57] ABSTRACT

An improved method and system for entering text with an on-screen keyboard. The preferred on-screen keyboard includes an alphabetical list of character buttons interspersed with buttons for the 92 most common English words, prefixes, and suffixes. The characters and words of the on-screen keyboard are typically entered with a single tap from a pen on the appropriate button. However, a double tap with a pen on a word button enters the word associated with the button followed by a space character, the word "the", and a space character. If the user taps a character button and drags the pen in either the north, south, east or west direction (called a "flick"), then the embodiment enters the character associated with the character button along with one of the vowels, "o", "e", "i" or "a", respectively. The preferred on-screen keyboard also includes smart punctuation buttons, which enter text in addition to the punctuation character itself. For example, the "PERIOD" button enters a period character followed by two space characters, and then activates the "Shift" button so that the next entered word is capitalized.

32 Claims, 23 Drawing Sheets

OTHER PUBLICATIONS

Mahach, "A comparison of computer input devices: linus pen, mouse, cursor keys and keyboard," *Proceedings of the Human Factors Society 33rd Annual Meeting*, pp. 330–334, 1989.

Carr et al., *The Power of PenPoint*, Addison–Wesley Publishing Co., Inc., 1991, pp. 21–48.

Leventhal et al., *Human Aspects in Computing: Design and Use of Interactive Systems and Work With Terminals*, Elsevier Science Publishers B.V., 1991, pp. 108–112.

Plaisant et al., "Touchscreen interfaces for alphanumeric data entry," *Proceedings of the Human Factors Society 36th Annual Meeting*, pp. 293–297, 1992.

*Microsoft Windows for Pen Computing User's Guide, Guide to Pen Computing*, Microsoft Corporation, 1992, pp. 1–61.

*PenPoint Appliction Writing Guide*, Addison–Wesley Publishing Co., 1993, pp. 7–21, 519–522, 535–547.

Shein, *WiViK2 Visual Keyboard for Windows 3.1*, Prentke Romich Company, Wooster, Ohio, publication date unknown.

METHOD AND SYSTEM FOR ENTERING DATA USING AN IMPROVED ON-SCREEN KEYBOARD

TECHNICAL FIELD

This invention relates to a computer method and system for entering data using an improved on-screen keyboard.

BACKGROUND OF THE INVENTION

Many pen-based computer systems provide handwriting recognition software that allows users to enter handwritten data using a pen input device. The handwriting recognition software translates characters in the handwritten data into ASCII characters and displays the ASCII characters to the user. The user may write directly over the displayed ASCII characters with the pen input device to correct any errors in how the software recognized the handwritten input. Unfortunately, the reliability of such handwriting recognition software is currently limited, due in part to the variance in handwriting styles.

Other pen-based computer systems allow users to enter data using on-screen keyboards (i.e., keyboards displayed on a display device). Each displayed key corresponds with a printable character. The displayed keys of the on-screen keyboard are typically configured in the conventional pattern found on most typewriters. To enter data, the user simply taps on a displayed key of the on-screen keyboard with the pen input device. The character represented by the displayed key is automatically entered as input to the computer system. Unfortunately, conventional systems that use on-screen keyboards are difficult to use and prone to error. A user of the conventional on-screen keyboard must enter data one character at a time. In particular, the user must position the pen over a character and then select the character to input the character. Then, the user must position the pen over the next character to be input and select the next character. This is repeated on a per character basis until all of the characters have been input are inputted. As a result, it may take a long period of time to enter data. Moreover, since a user must select each character of the input, the user has a high probability of making an error.

SUMMARY OF THE INVENTION

In accordance with a first aspect of the present invention, an improved method and system for entering text with an on-screen keyboard are provided. The preferred on-screen keyboard includes a static list of character buttons interspersed with buttons for a static set of common words. The character buttons and word buttons are maintained at fixed locations. By providing a static set of character buttons and word buttons at fixed locations, a user of the preferred on-screen keyboard enters text more efficiently because the user becomes familiar with the location of each button, and thus can actuate a given button more quickly than with prior on-screen keyboards. The characters and words of the on-screen keyboard are typically entered with a single tap from a pen on the appropriate button.

In a second aspect of the present invention a double tap with a pen on a word button enters the word associated with the button followed by a space character, the word "the", and a space character.

In another aspect of the invention, if the user taps a character button and drags the pen in either the north, south, east or west direction (called a "flick"), then the embodiment enters the character associated with the character button along with one of the vowels, "o", "i", "e", or "a", respectively.

The preferred on-screen keyboard also includes smart punctuation buttons, which enter text in addition to the punctuation character itself. For example, the "PERIOD" button enters a period character followed by two space characters, and then activates the "Shift" button so that the next entered word is capitalized.

DETAILED DESCRIPTION OF THE INVENTION

An embodiment of the present invention provides an improved method and system for entering character data with an on-screen keyboard. The preferred on-screen keyboard includes an alphabetical list of character buttons interspersed with buttons for the 92 most common English words, prefixes, and suffixes. The characters and words of the on-screen keyboard are typically entered with a single tap from a pen on the appropriate button. However, a double tap with a pen on a word button enters the word associated with the button followed by a space character, the word "the", and a space character. If the user taps a character button and drags the pen in either the north, south, east or west direction (called a "flick"), then the embodiment enters the character associated with the character button along with one of the vowels, "o", "e", "i", or "a", respectively. The preferred on-screen keyboard also includes smart punctuation buttons, which enter text in addition to the punctuation character itself. For example, the "PERIOD" button enters a period character followed by two space characters, and then activates the "Shift" button so that the next entered word is capitalized.

Figure 1:
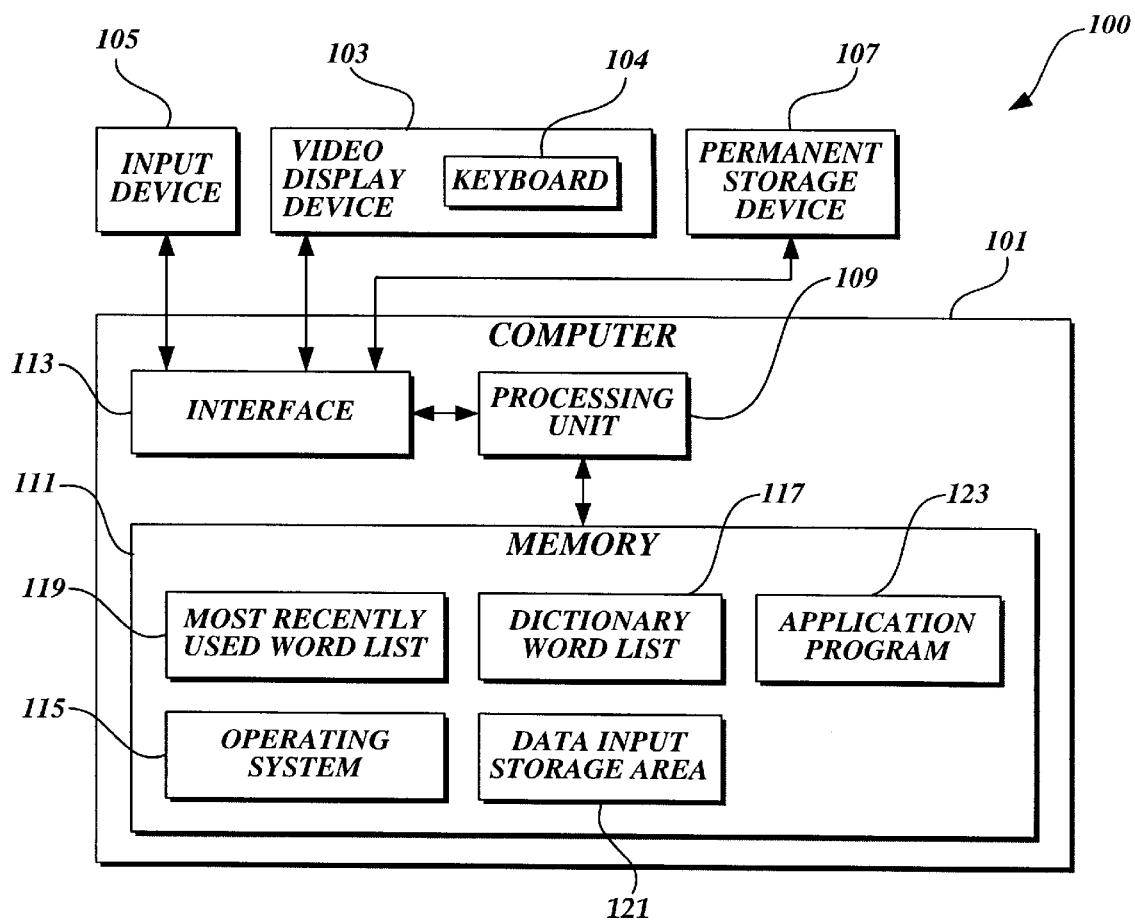
FIG. 1 is a block diagram of a computer system for practicing a preferred embodiment of the present invention.

OVERVIEW OF THE SYSTEM:

FIG. 1 is a block diagram of a computer system 100 for practicing the preferred embodiment of the present invention. The computer system 100 includes a computer 101, a video display device 103, an on-screen keyboard 104, an input device 105, such as a mouse, or pointing device, and a permanent storage device 107, such as a disk drive. The computer 101 includes a processing unit 109, a computer memory 111, and an interface 113 for enabling communication between the processing unit 109 and peripheral devices (e.g., the video display device 103, the input device 105, and the permanent storage device 107).

The computer memory 111 holds a number of items, including a copy of an operating system 115 such as an embellished version of the Microsoft Windows operating system (sold by Microsoft Corporation of Redmond, Wash.) that provides an on-screen keyboard as a resource. The operating system 115 is responsible for controlling the allocation and usage of the hardware resources of the system, such as memory 111, processing unit 109, and permanent storage device 107. The remaining contents of the memory 111 will be described in more detail below.

The preferred keyboard 104 includes a number of different components, each of which is designed to ease data entry using the input device 105. In the preferred embodiment, each button is a child window control, such as provided in the Microsoft Windows operating system. Each control processes mouse and keyboard messages by hooking messages destined for a parent window and has the option of processing the hooked messages. The messages may then be passed on to the parent window. The child window also notifies its parent window when the child window's state has changed.

Figure 2A:
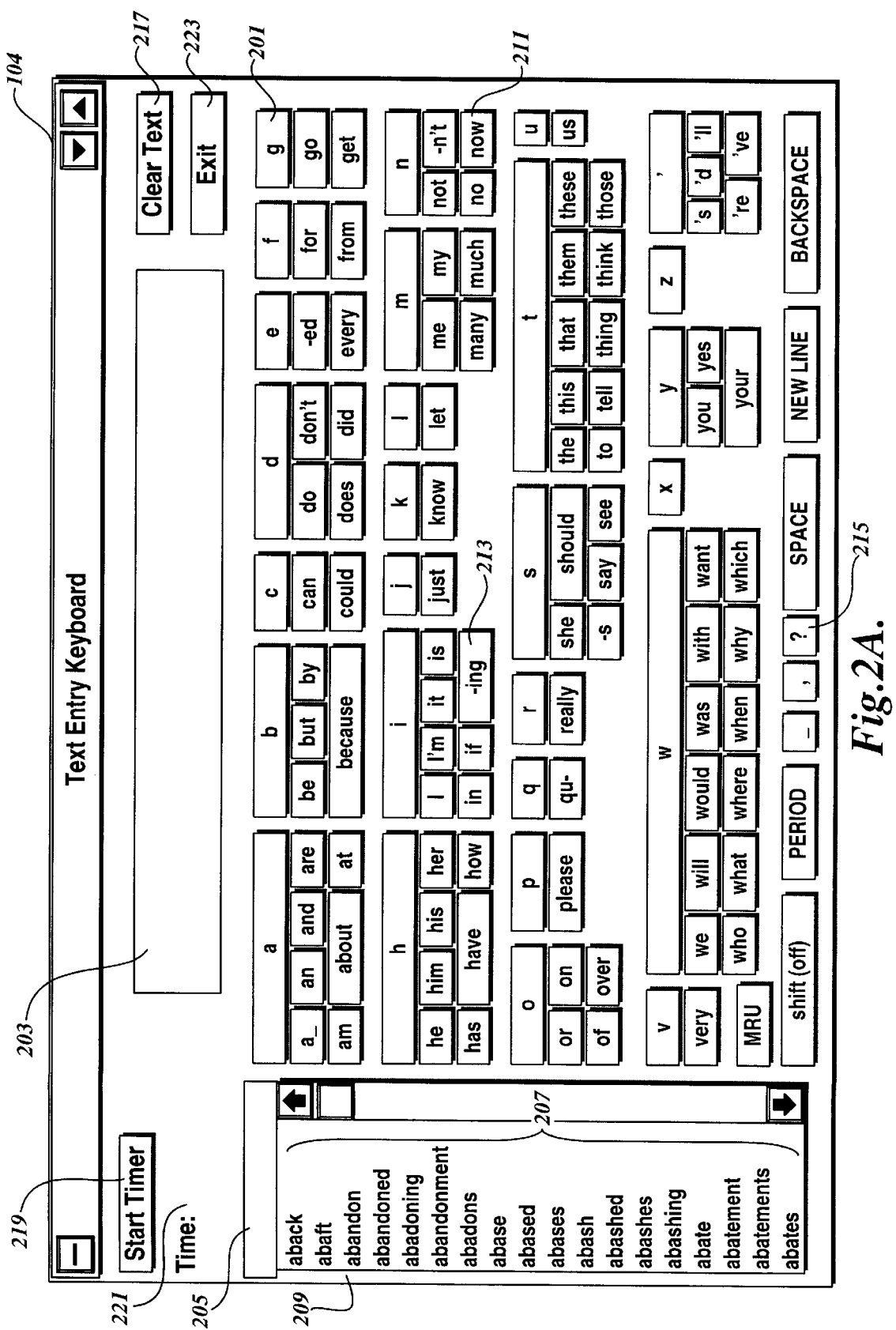
FIG. 2A illustrates a preferred on-screen keyboard for use in the computer system of FIG. 1.

FIG. 2A illustrates a preferred on-screen keyboard 104 for use in the computer system of FIG. 1. The on-screen keyboard 104 is a resource provided by the operating system 115 which may be used by application programs or the operating system. Those skilled in the art will appreciate that the on-screen keyboard need not be implemented as part of the operating system, but for the purposes of the discussion below it is assumed that the operating system provides this resource. The on-screen keyboard 104 preferably includes letter buttons 201. Each letter button 201 corresponds to one of the 26 letters in the Arabic alphabet.

Figure 3:
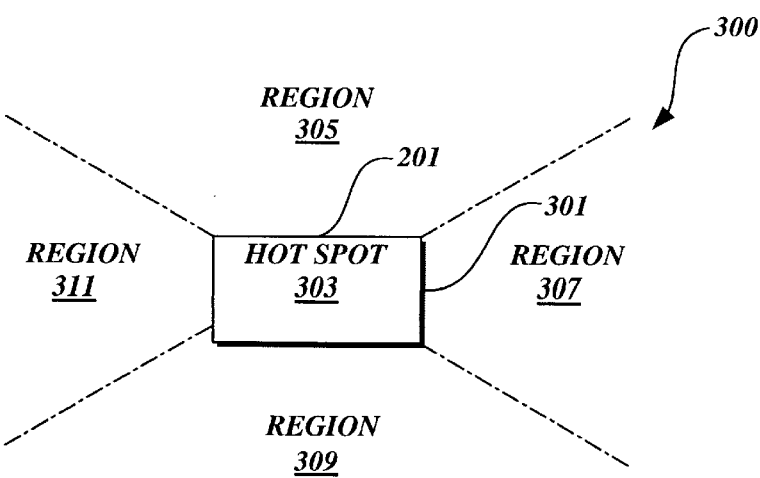
FIG. 3 shows a view of a representative letter button for the on-screen keyboards of FIGS. 2A and 2B.

FIG. 3 shows a more detailed view of a letter button 201. As FIG. 3 illustrates, each letter button includes a border 301 defining a hot spot (or control spot) 303. The hot spot 301 typically displays the letter (e.g., "G") corresponding to the letter button 201. When the user actuates the hot spot 301 with the input device 105, the operating system 115 stores the corresponding letter in a data input buffer 121 of the memory 111 and displays the corresponding letter in both a document box 203 and a text box 205 of the on-screen keyboard 104. The preferred steps performed by the operating system 115 in response to an actuation of the letter button 201 are discussed in more detail below and are shown in FIG. 15.

Another aspect of the letter button 201 allows the user to enter two different letters from one letter button 201. If the user actuates the hot spot 303 and moves the input device 105 across the border 301 into a region 305, a region 307, a region 309, or a region 311 (sometimes called a "flick"), then the operating system 115 displays a vowel adjacent to the corresponding letter in both the document box 203 and the text box 205. Which vowel is displayed depends on which region the input device 105 is in when it is deactivated. Region 305 preferably corresponds to "o"; region 307 preferably corresponds to "i"; region 309 preferably corresponds to "e"; and region 311 preferably corresponds to "a". For example, if the user flicks into region 305 of the letter button 201 for the letter "t", then the operating system 115 displays the letter combination "to" in both the document box 203 and the text box 205. The vowels "a", "e", "i" and "o" were chosen because they are frequently used letters. Because the letter "e" is the most common letter in the English language, it is preferably associated with the easiest flick, the downward flick into region 309. The downward flick is the easiest flick because the downward stroke is often used when writing letters. A more detailed discussion of the preferred steps for detecting and processing flicks is set forth below in conjunction with FIGS. 16–17.

The preferred on-screen keyboard 104 also includes an alphabetical list of dictionary words 117 (FIG. 2A shows only a portion of the dictionary list) displayed in a dictionary list box 209. The dictionary words 117 displayed in the dictionary list box 209 are automatically scrolled to that portion of the list that begins with the string of characters displayed in the text box 205. Selecting a word from the dictionary word list 117 displays the selected word in the document box 203. In this way the dictionary list box 209 acts as a word predictor for the user; hence, allowing the user to save keystrokes.

Figure 18:
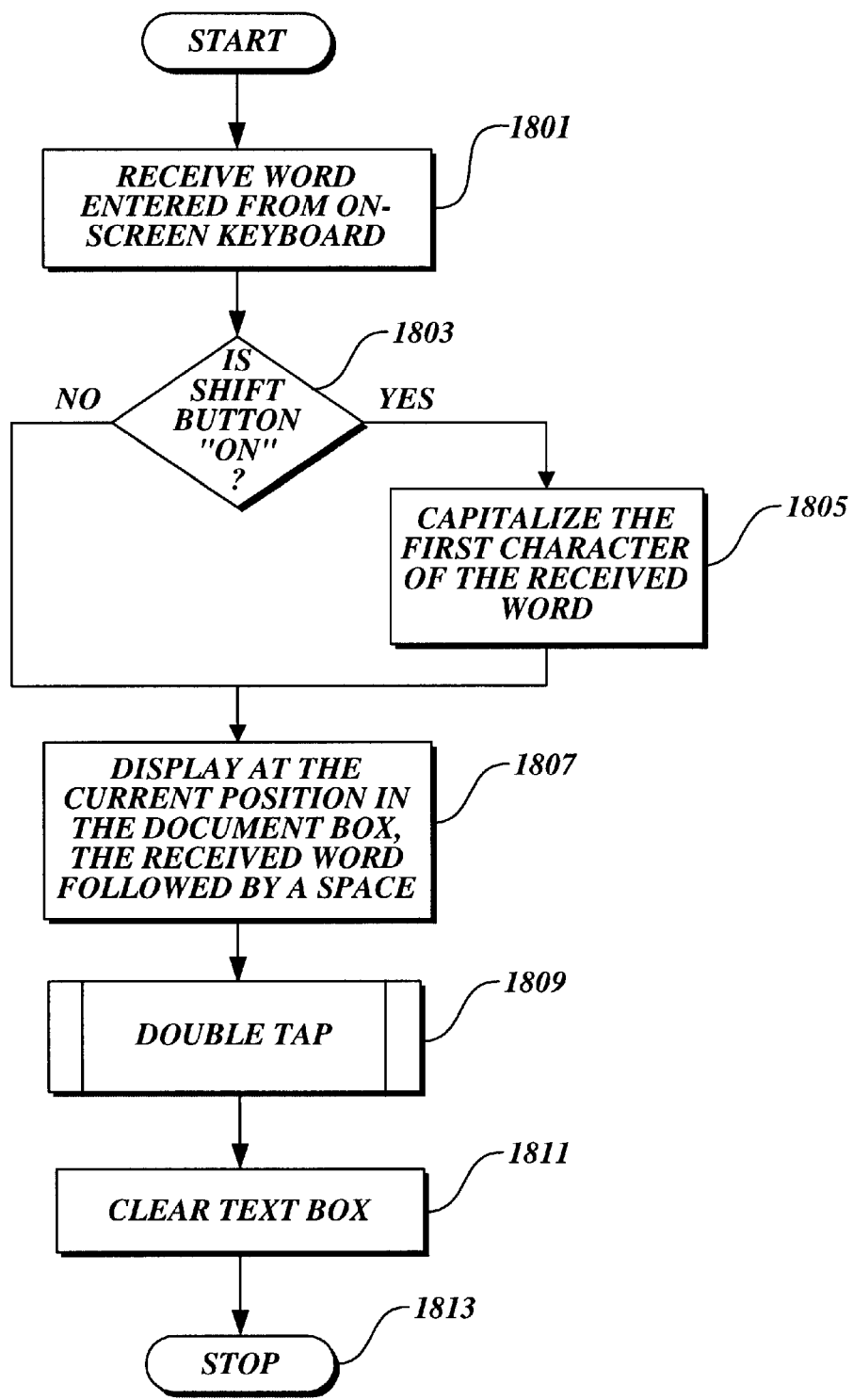
FIG. 18 is a flow diagram of a preferred module which processes an actuation of the word button from the on-screen keyboard.

In addition to the letter buttons 201, the on-screen keyboard 104 also includes word buttons 211. The preferred visual layout of the word button 211 is identical to that of the letter button 201 (see FIG. 3) except that the hot spot 303 displays a word instead of a letter. When the user actuates the hot spot 303 of the word button 211 the operating system 115 displays in the document box 203 the word corresponding to the actuated word button. Typical word buttons 211 correspond to the words "about", "because", "say", "want", and "why". The preferred steps performed by the operating system 115 in response to an actuation of the word button 211 are discussed in detail below and are shown in FIG. 18.

Figure 19:
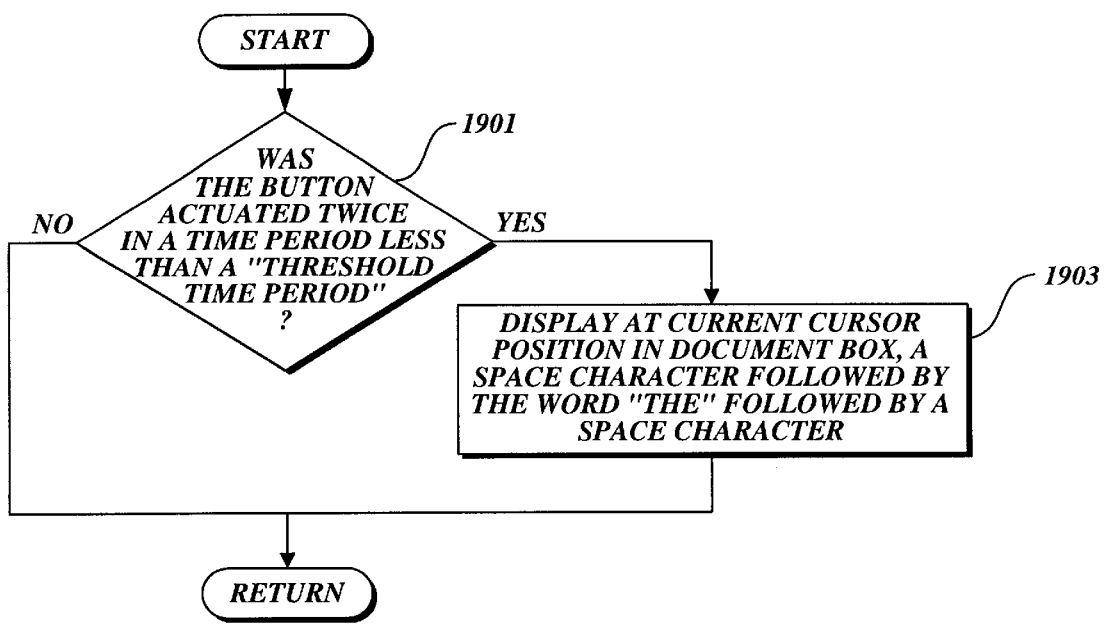
FIG. 19 is a flow diagram of a preferred module which determines whether a double-tap operation has been performed on the word button of the on-screen keyboard.

Another aspect of the word button 211 allows the user to enter two words from one word button 211. If the user actuates the hot spot 303 of the word button 211 twice within a predetermined period of time (sometimes described as a "double tap"), then the operating system 115 preferably displays the word "the" in the document box 203 adjacent to the corresponding word. "The" is preferably used because it is the most common word in the English language. Those of ordinary skill in the art will understand that a word other than "the" can be displayed in the document box 203 in response to the double tap. The preferred method for detecting double taps is discussed below and is shown in FIG. 19.

Figure 21:
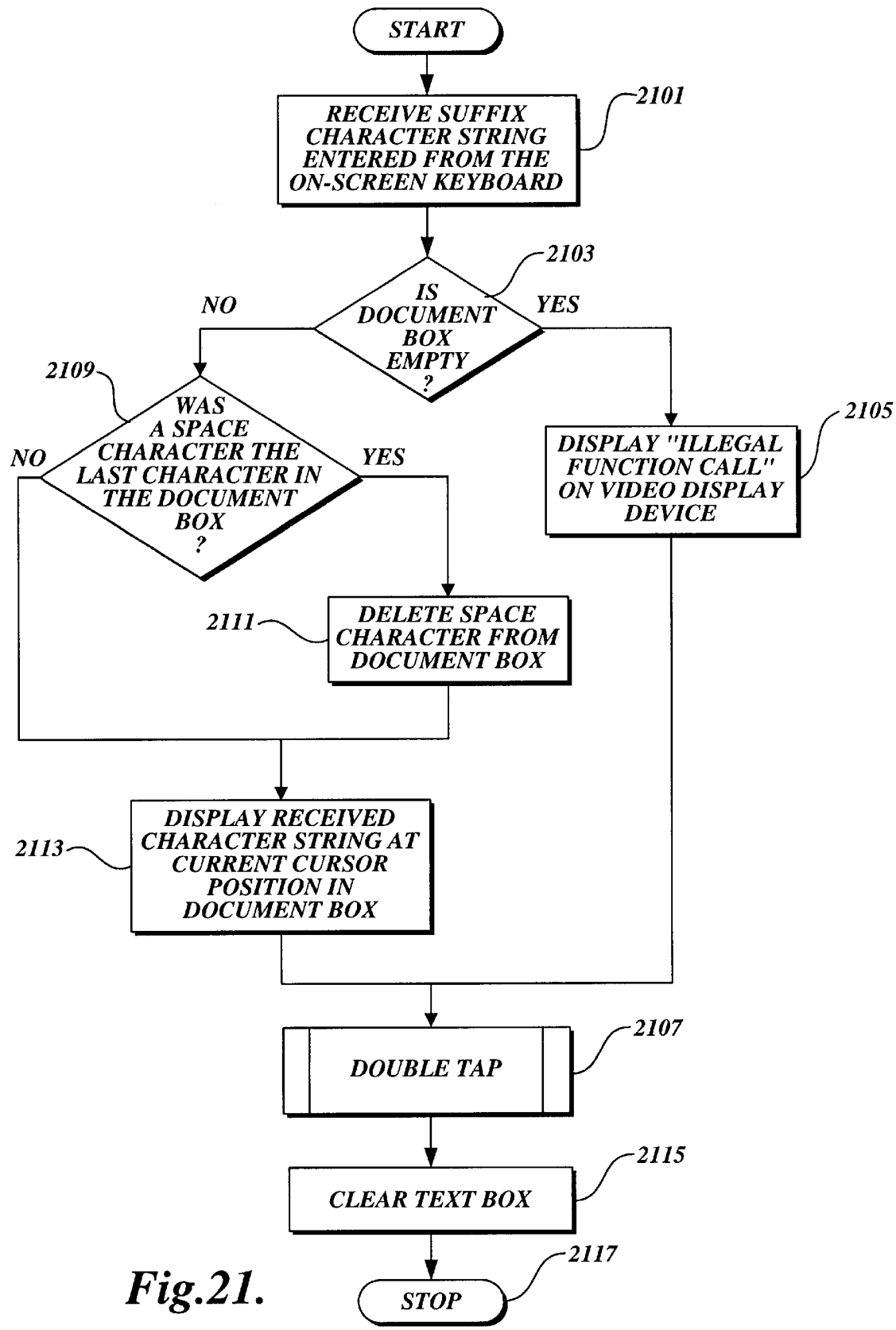
FIG. 21 is a flow diagram of a preferred module which processes actuation of the suffix button.
Figure 22:
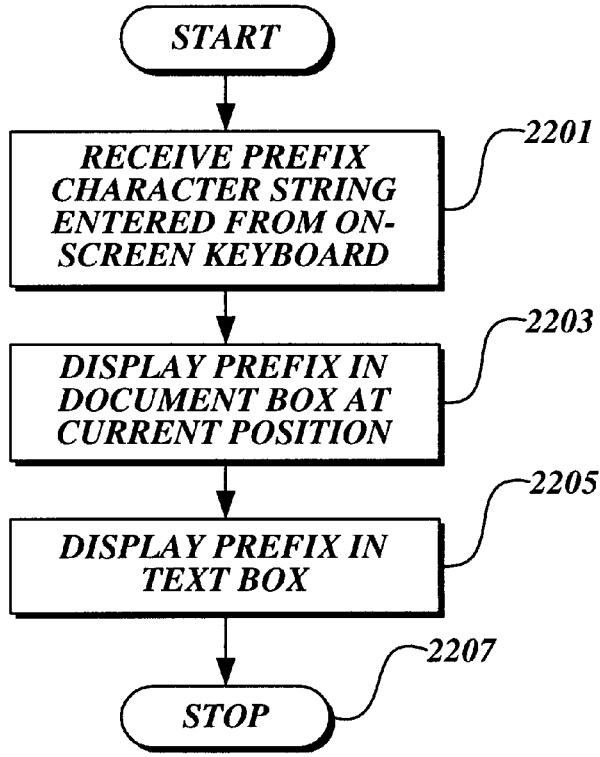
FIG. 22 is a flow diagram of a preferred module which performs processing after an actuation of one of the prefix buttons.

The on-screen keyboard 104 also includes affix buttons 213 for entering prefixes and suffixes. The preferred visual layout of an affix button 213 is identical to that of the letter button 201 (see FIG. 3) except that the hot spot 303 displays an affix (i.e., a prefix or a suffix) instead of a letter. When the user actuates the hot spot 303 of the affix button 213 the operating system 115 displays in the document box 203 the affix corresponding to the affix button. Typical affix buttons 213 correspond to the affixes "ing", "s", "ed", and "qu". A more detailed discussion of the preferred steps performed upon actuation of the affix button 213 is set forth below and is shown in FIGS. 21–22.

Figure 20:
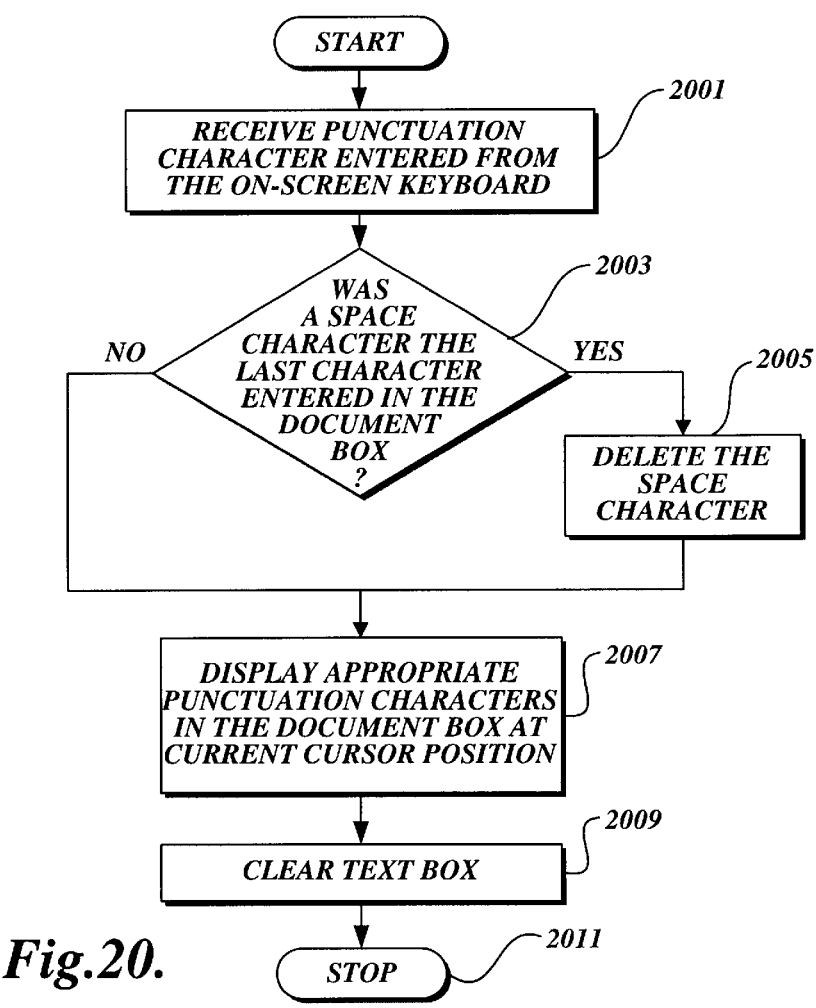
FIG. 20 is a flow diagram of a preferred module which processes an actuation of the punctuation button.

To facilitate entry of punctuation characters, the on-screen keyboard 104 includes punctuation buttons 215. The preferred visual layout of the punctuation button 215 is identical to that of the letter button 201 (see FIG. 3) except that the hot spot 303 displays a punctuation character such as "?" or ",", instead of a letter. When the user actuates the hot spot 303 of the punctuation button 215 the operating system 115 displays in the document box 203 the punctuation character displayed in the hot spot of the punctuation button. For some punctuation buttons 215, the operating system 115 displays in the document box 203 characters in addition to those displayed in the hot spot 303. For example, if the user actuates the "PERIOD" punctuation button 215 or the "?" punctuation button 215 then the operating system 115 displays the appropriate punctuation character, displays two space characters, and capitalizes the next character entered on the on-screen keyboard 104. A more detailed discussion of the steps performed upon actuation of the punctuation button 215 is set forth below and is shown in FIG. 20.

The on-screen keyboard 104 also includes a clear text button 217 which clears the document box 203, a timer button 219 which displays in a time field 221 an elapsed time that the user has used the on-screen keyboard 104, and an exit button 223 to close the on-screen keyboard 104.

Figure 2B:
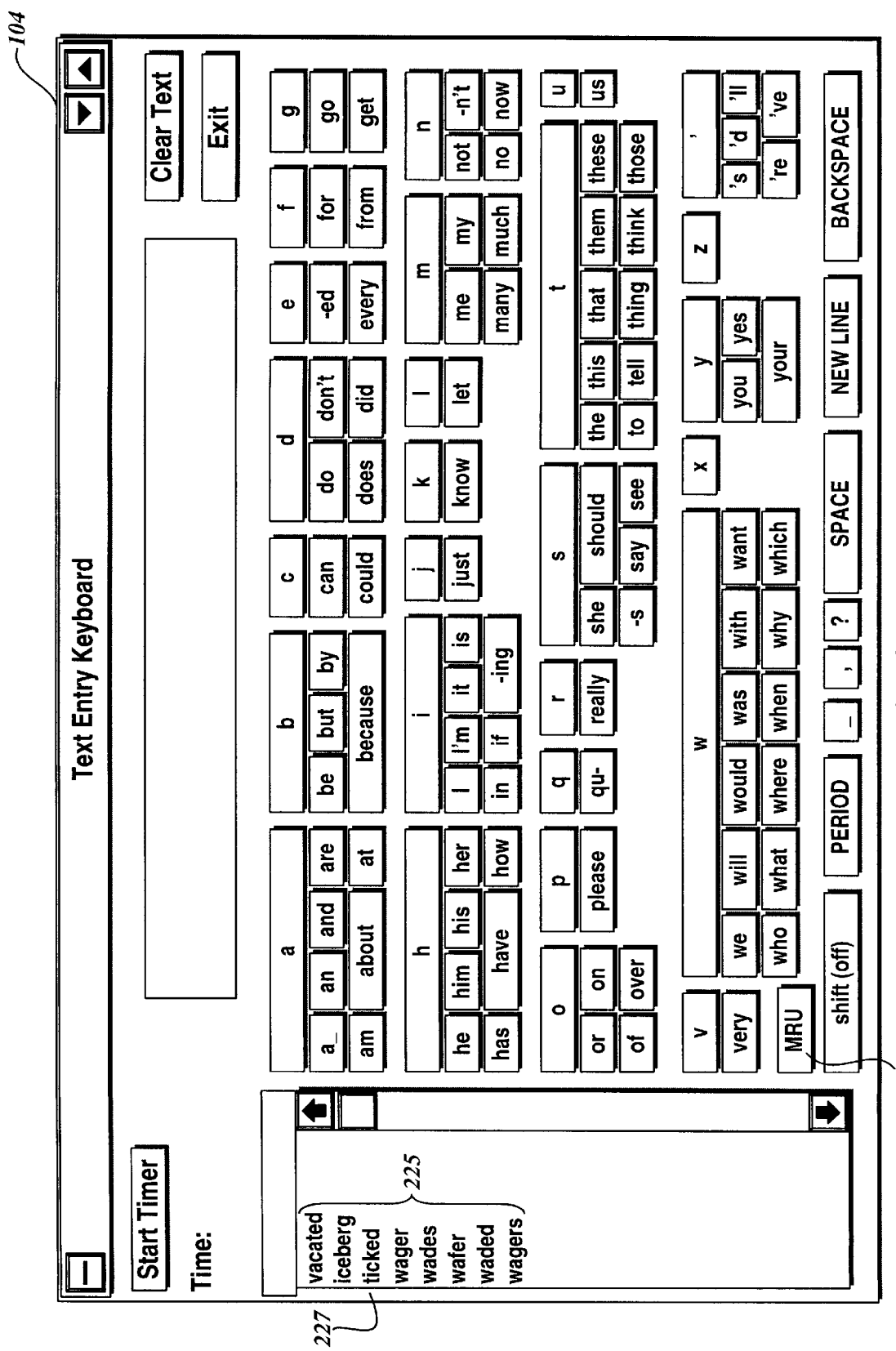
FIG. 2B illustrates the preferred on-screen keyboard with a most recently used list displayed in a most recently used list box, in accordance with the preferred embodiment.

FIG. 2B is identical to FIG. 2A in all respects but one. FIG. 2B illustrates the on-screen keyboard 104 with a most recently used (MRU) list 225 displayed in an MRU list box 227. The MRU list box 227 is displayed when the user actuates an MRU button 229. The MRU list 225 consists of the most recently selected words from the dictionary list box 209 (FIG. 2A). Like the dictionary list box 209, if the user selects a word from the MRU list 225 then the operating system 115 displays the selected word in the document box 203.

EXAMPLE

A fuller understanding of the preferred embodiment of the present invention may be obtained by considering an example of use of the on-screen keyboard 104. FIGS. 4–14 illustrate various states of the on-screen keyboard 104 during entry with the on-screen keyboard of the sentences "You can enter text using the on-screen keyboard. Enter text now."

Figure 4:
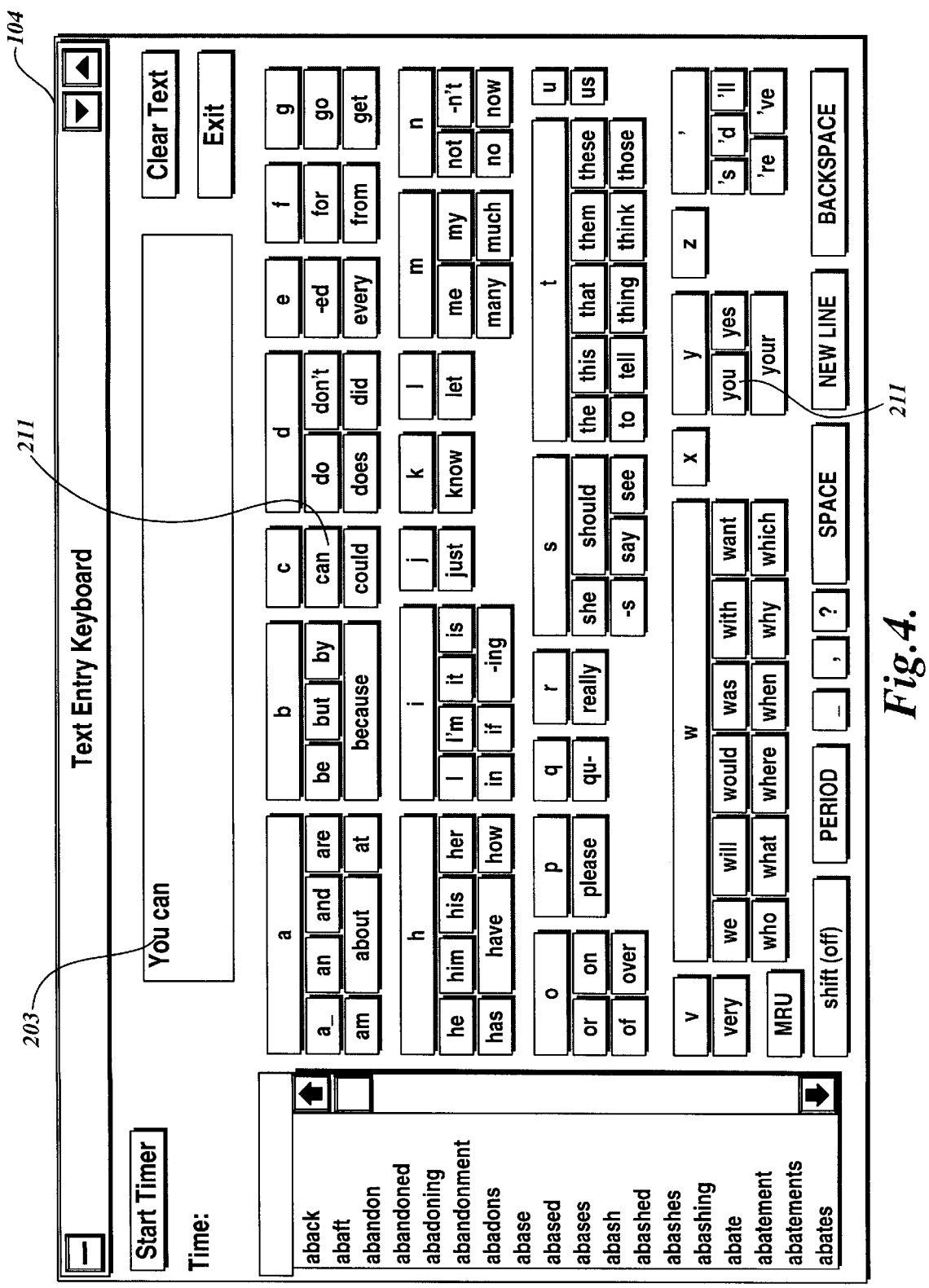
FIG. 4 illustrates a state of the preferred on-screen keyboard after the user actuates word buttons for the words "you" and "can".

Data entry on the on-screen keyboard 104 is typically user-initiated. To enter the words "You can", the user actuates the "Shift" punctuation button 215 along with the word buttons 211 for the words "you" and "can". As FIG. 4 illustrates, the operating system 115 displays the words in the document box 203.

Figure 5:
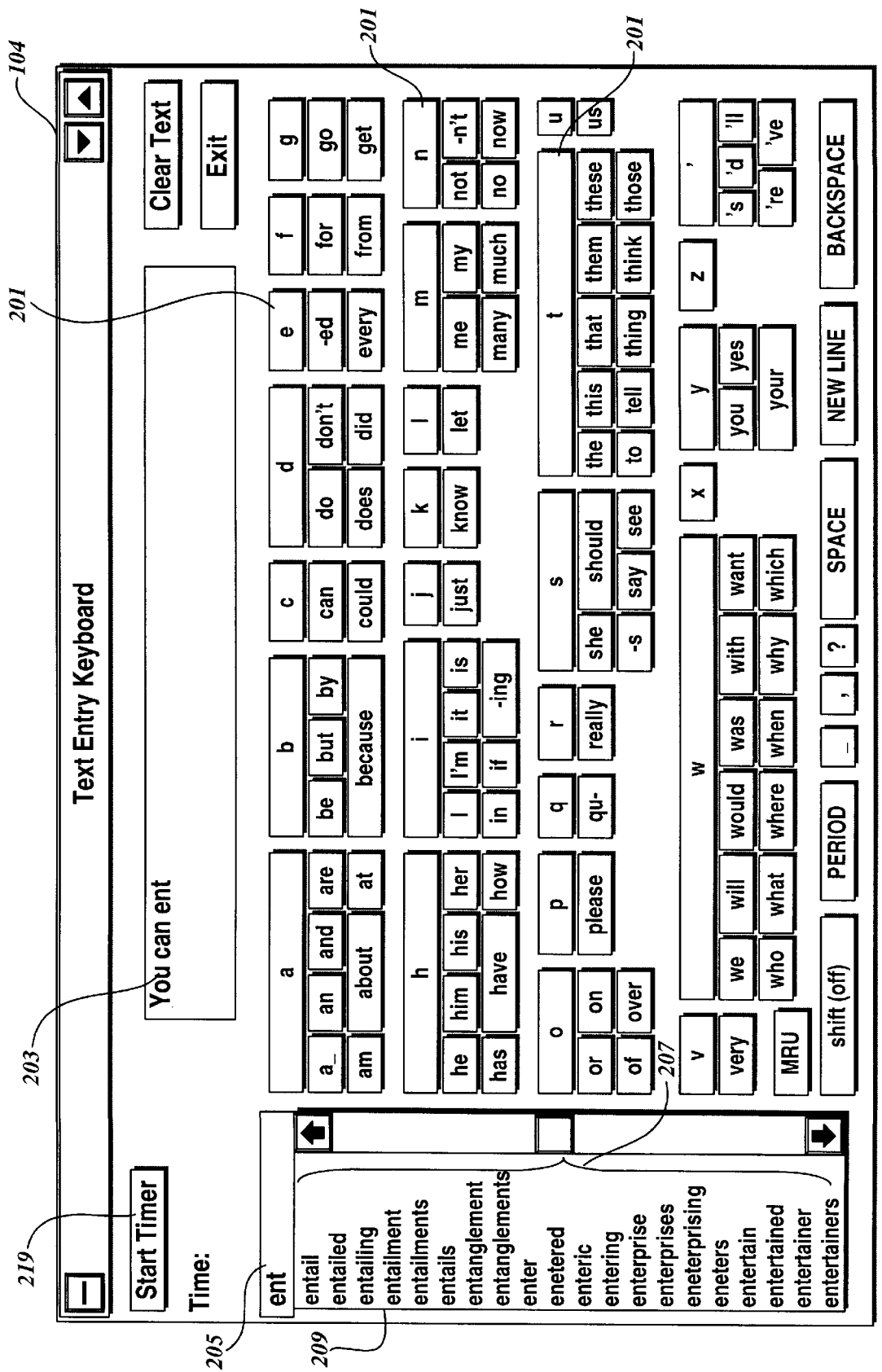
FIG. 5 illustrates a state of the preferred on-screen keyboard after the user enters the letter buttons for the letters "e", "n", and "t".
Figure 6:
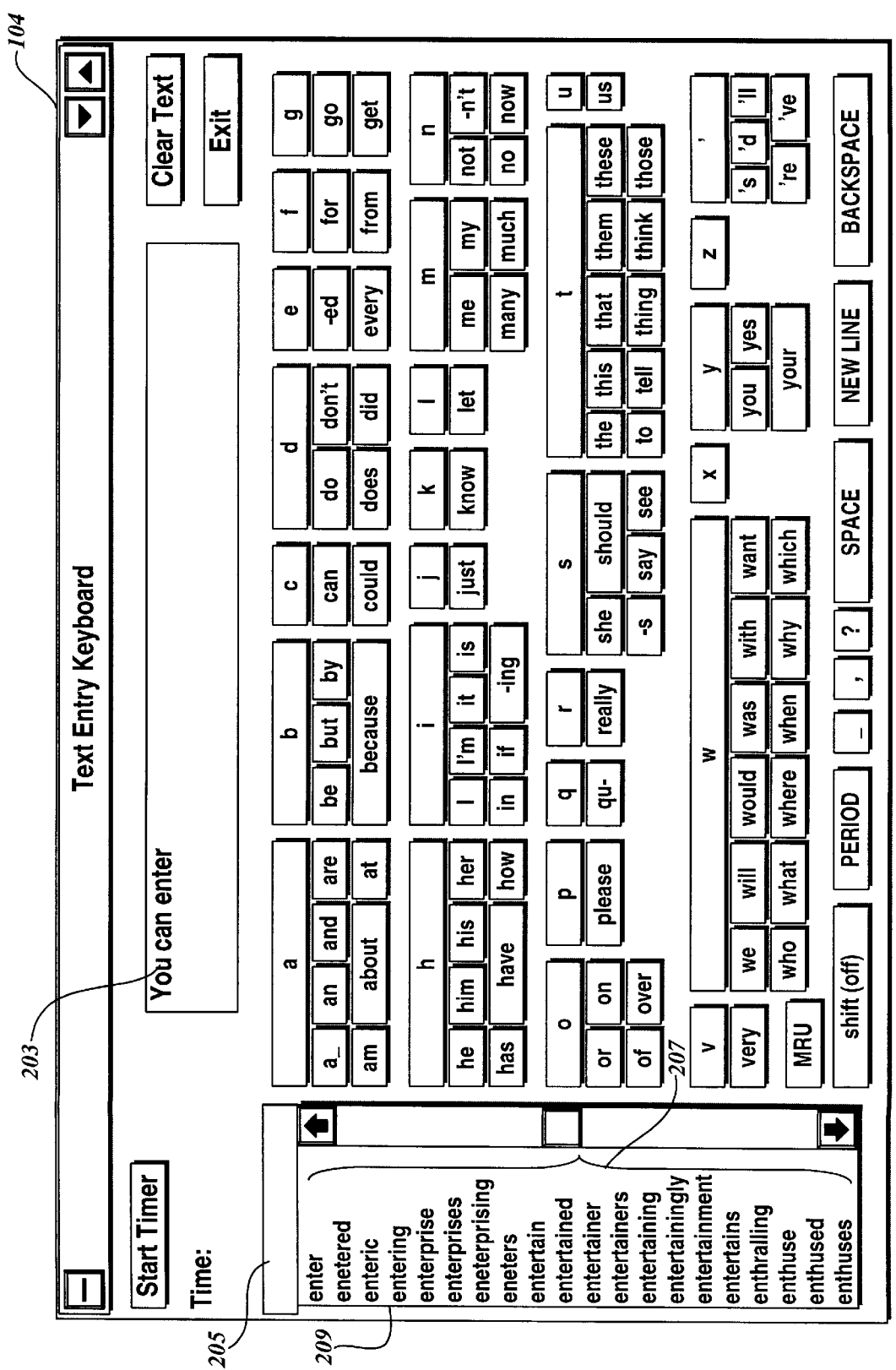
FIG. 6 illustrates a state of the preferred on-screen keyboard after the user selects the word "enter" from a dictionary list box.

In order to display the word "enter", the user actuates the letter buttons 201 for the letters "e", "n", and "t". Both the document box 203 and the text box 205 display the character string "ent" (FIG. 5). In addition, the dictionary list box 209 displays that portion of the dictionary list 117 that begins with the character string "ent", such as the word "enter". Instead of actuating the letter buttons 201 for the remaining letters "e" and "r", the user selects the word "enter" from the dictionary list box 209. In response, the document box 203 displays the word "enter" and the text box 205 is cleared (FIG. 6). In addition, the dictionary list box 209 scrolls the dictionary word list 117 so that the selected word "enter" is displayed first.

Figure 7:
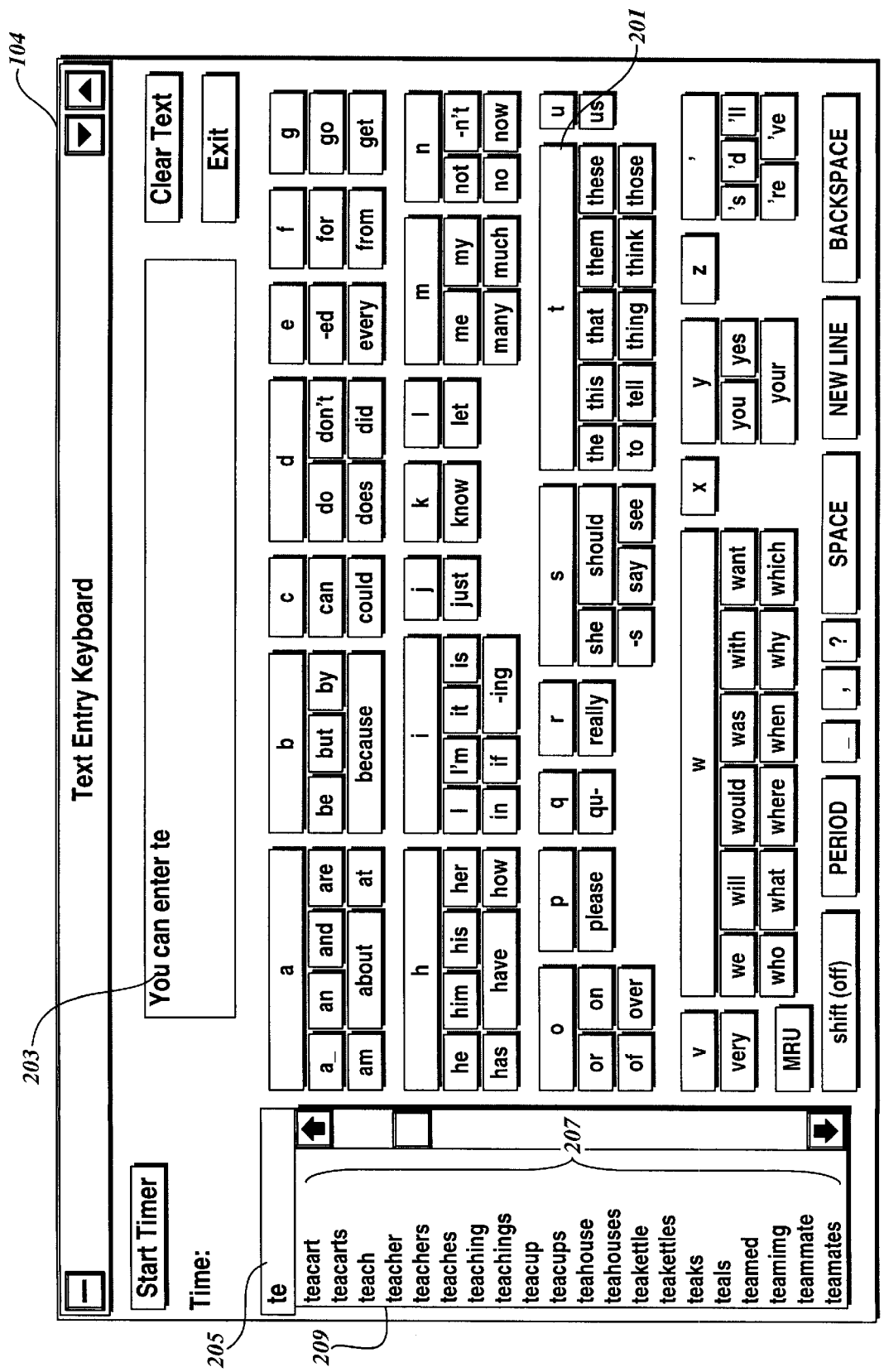
FIG. 7 illustrates a state of the preferred on-screen keyboard after the user performs a "flick" on the letter button for the letter "t".

Next, the user proceeds to enter the word "text". The user first performs a "flick" into region 309 (FIG. 3) on the letter button 201 for the letter "t". The document box 203 and the text box 205 display the character string "te" (FIG. 7). In addition, the dictionary list box 209 displays that portion of the dictionary word list 117 that begins with the character string "te". Since the dictionary list box 209 does not contain the word "text", the user proceeds to actuate the letter buttons 201 for the letters "x" and "t", thus completing entry of the word "text".

Figure 8:
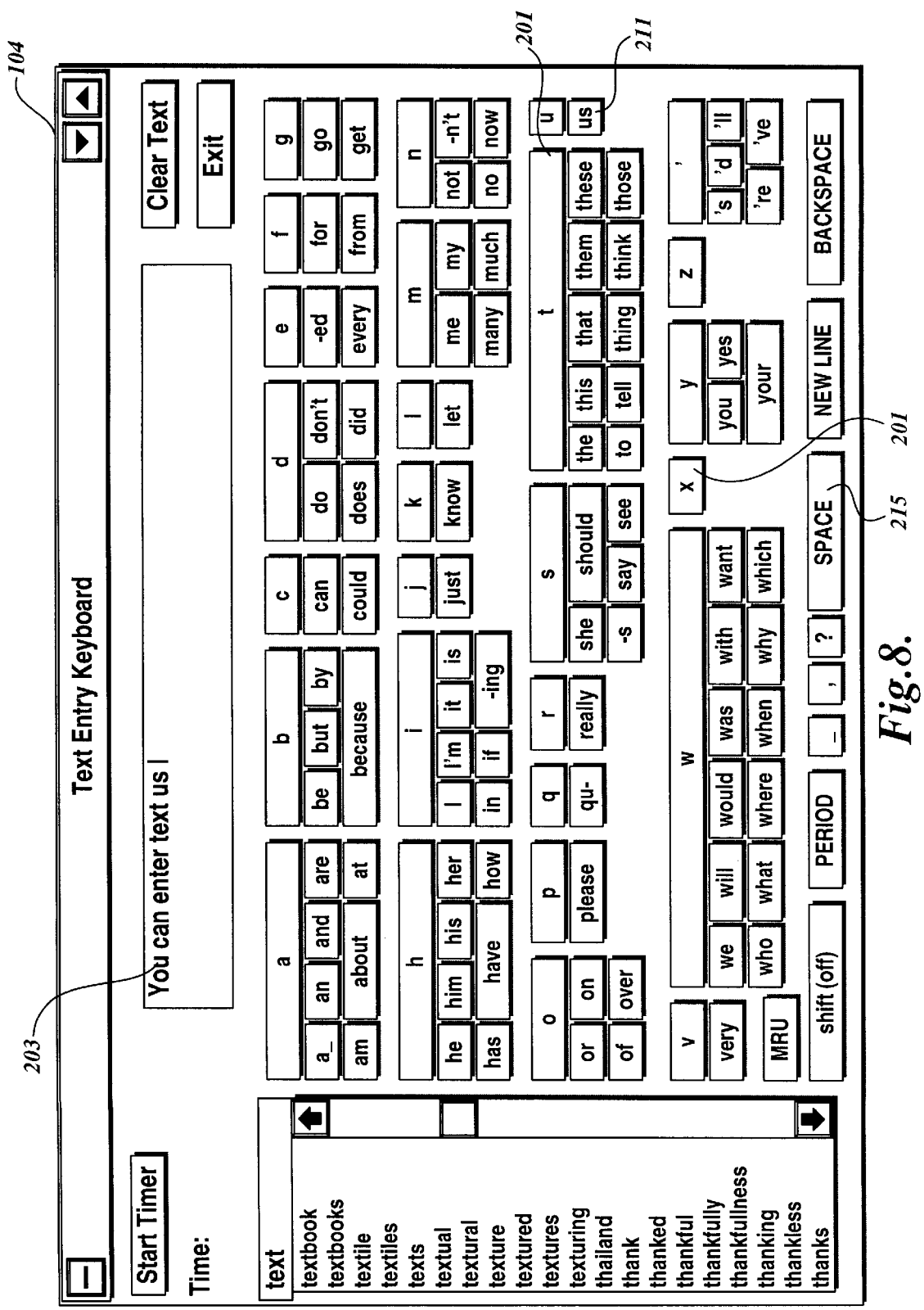
FIG. 8 illustrates a state of the preferred on-screen keyboard after the user actuates the letter buttons for the letters "x" and "t", the punctuation button for the punctuation character "space", and the word button for the word "us".
Figure 9:
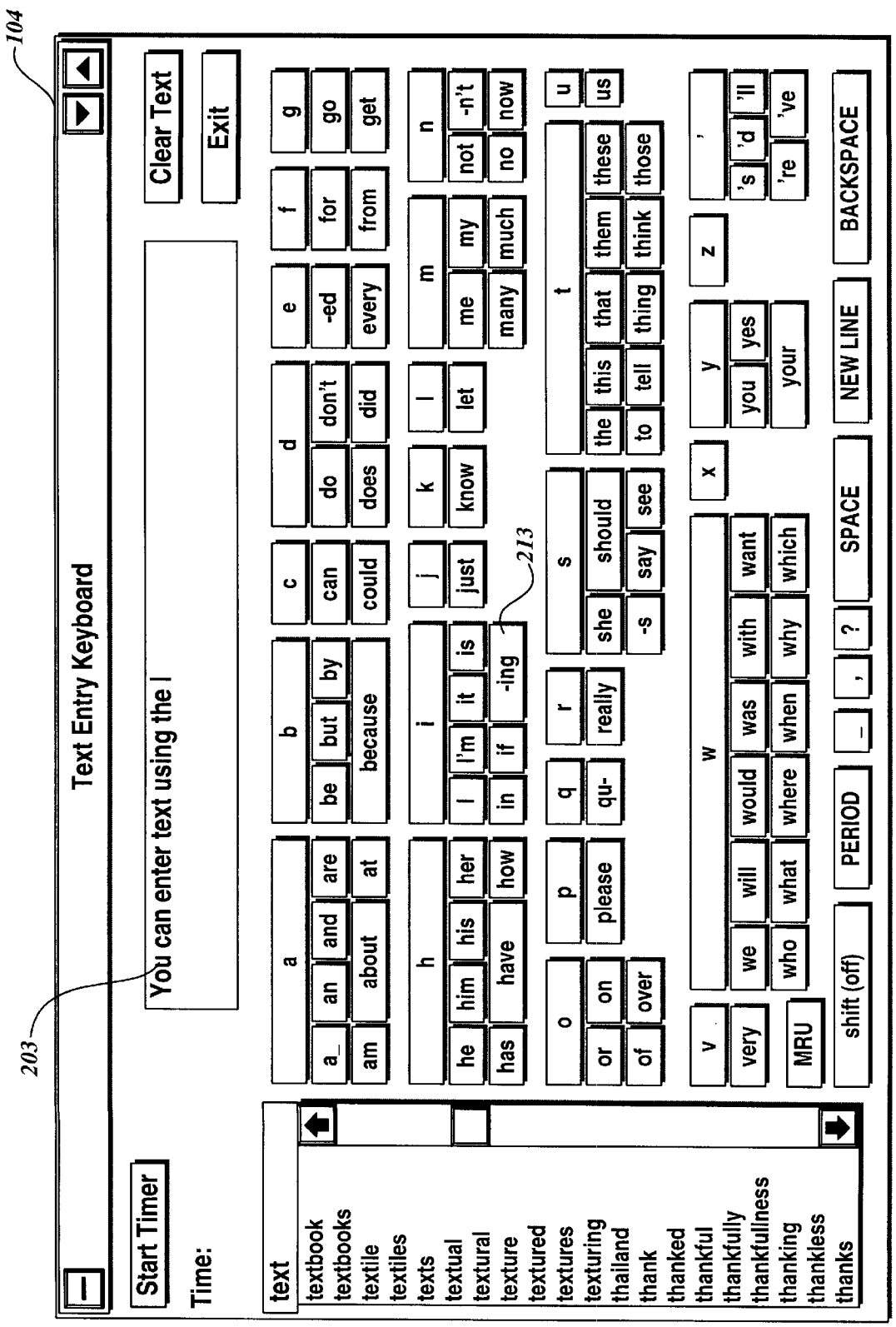
FIG. 9 illustrates a state of the preferred on-screen keyboard after the user double taps on the affix button for the suffix "ing".

The user then actuates the punctuation button 215 for the punctuation character "space" and the word button 211 for the word "us" to display these characters in the document box 203 (FIG. 8). Document box 203 of FIG. 8 also illustrates that a trailing space character is displayed in response to entry of the word "us". To complete entry of the word "using", the user double taps on the affix button 213 for the suffix "ing". As the document box 203 of FIG. 9 shows, the operating system 115 first deletes the trailing space character and inserts the suffix "ing". In addition, the operating system displays a space character followed by the word "the" followed by a trailing space character.

Figure 10:
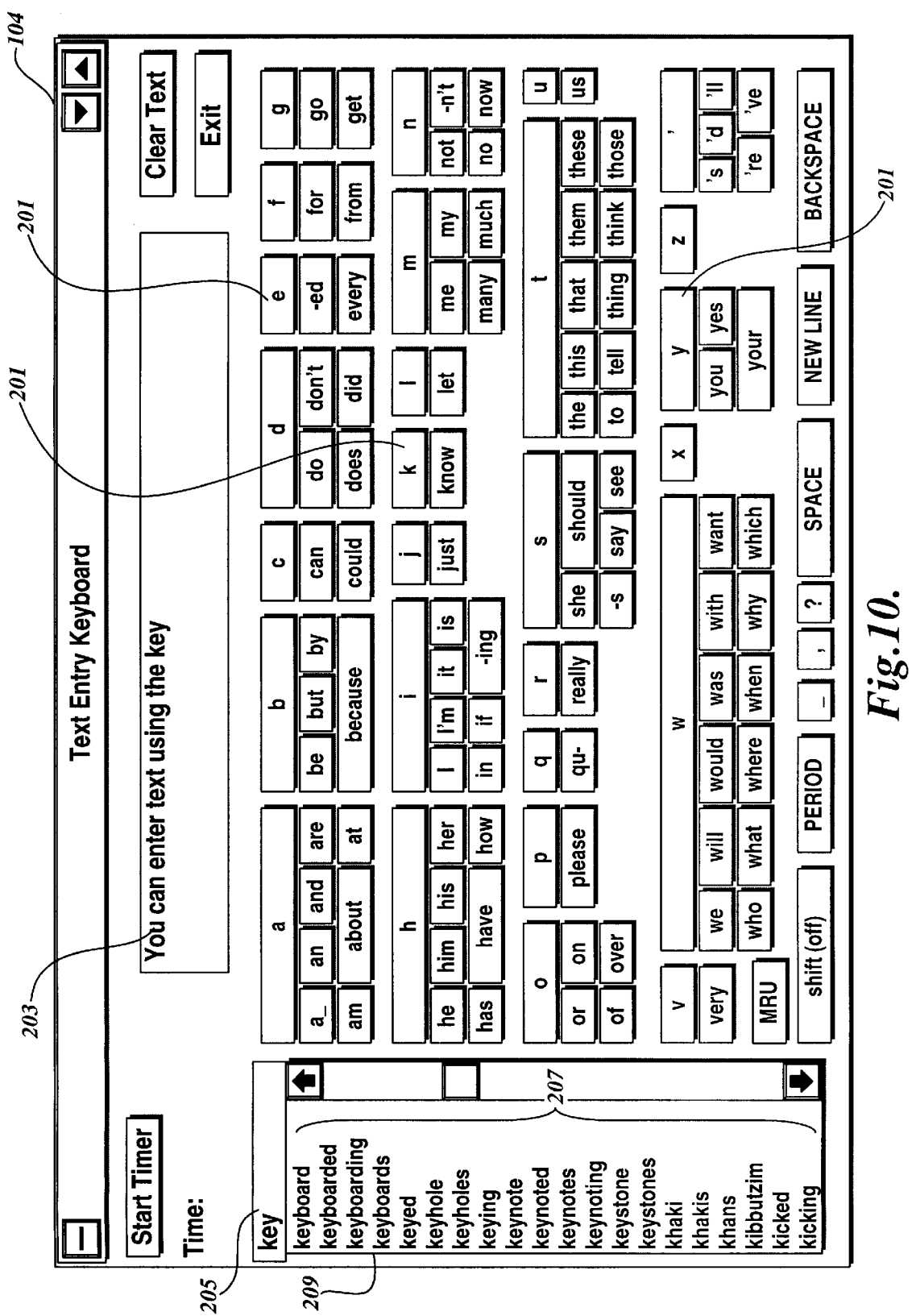
FIG. 10 illustrates a state of the preferred on-screen keyboard after the user actuates the letter buttons for the letters "k" "e" and "y".
Figure 11:
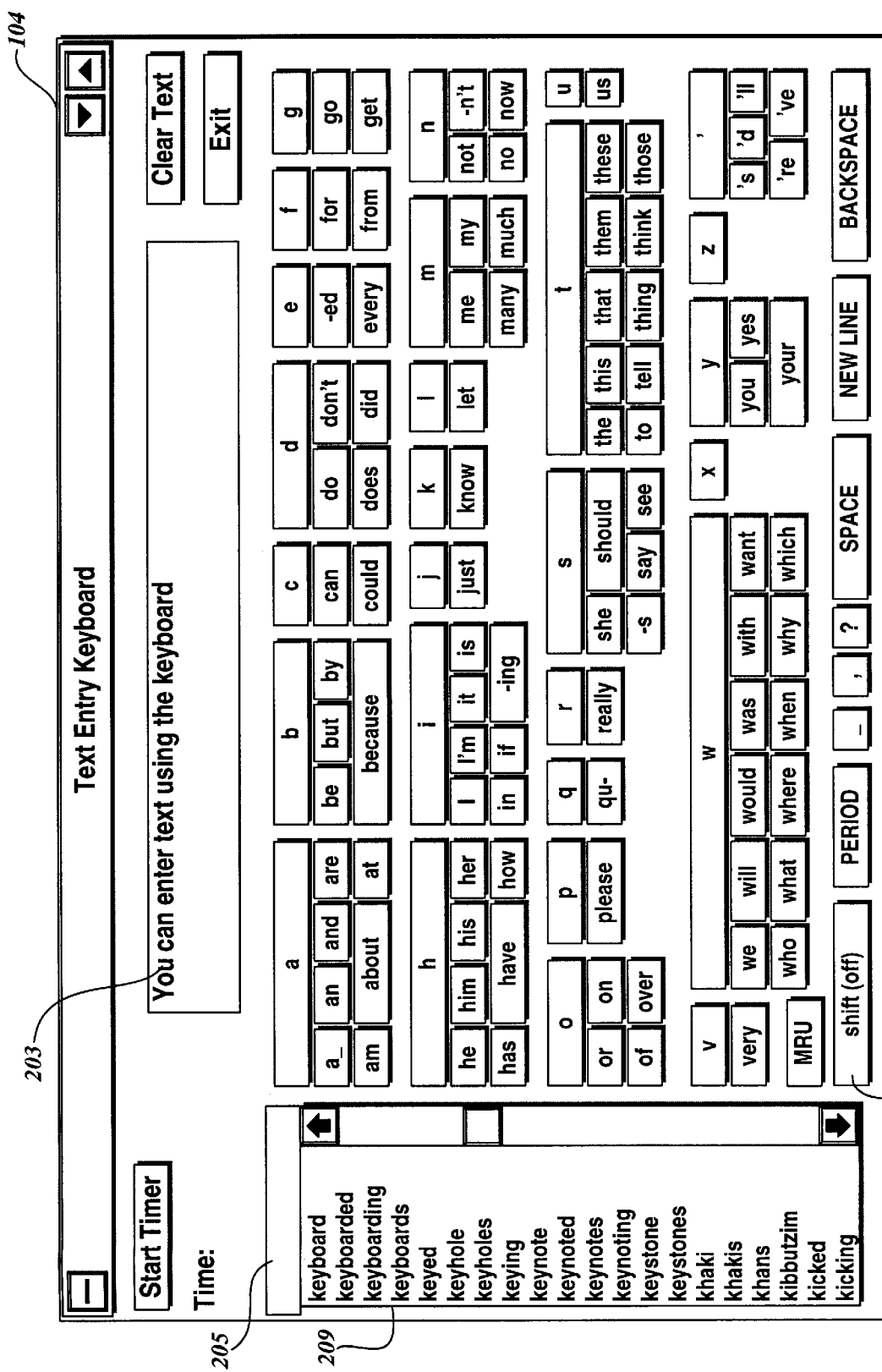
FIG. 11 illustrates a state of the preferred on-screen keyboard after the user selects the word "keyboard" from the dictionary list box.

The user then proceeds to enter the word "keyboard" as the last word in the first sentence. To accomplish this the user first actuates the letter buttons 201 for the letters "k" "e" and "y". The character string "key" is displayed in both the document box 203 and the text box 205 (FIG. 10). In addition, the dictionary list box 209 displays that portion of the dictionary word list 117 that begins with the character string "key". As FIG. 10 also illustrates, the word "keyboard" is displayed in the dictionary list box 209. To accelerate entry of the word "keyboard", the user selects the word "keyboard" from the dictionary list box 209. In response, the document box 203 displays the word "keyboard" and the text box 205 is cleared (FIG. 11). It should be noted that the punctuation button 215 for a "Shift" operation is turned off during the processing state illustrated in FIG. 11.

Figure 12:
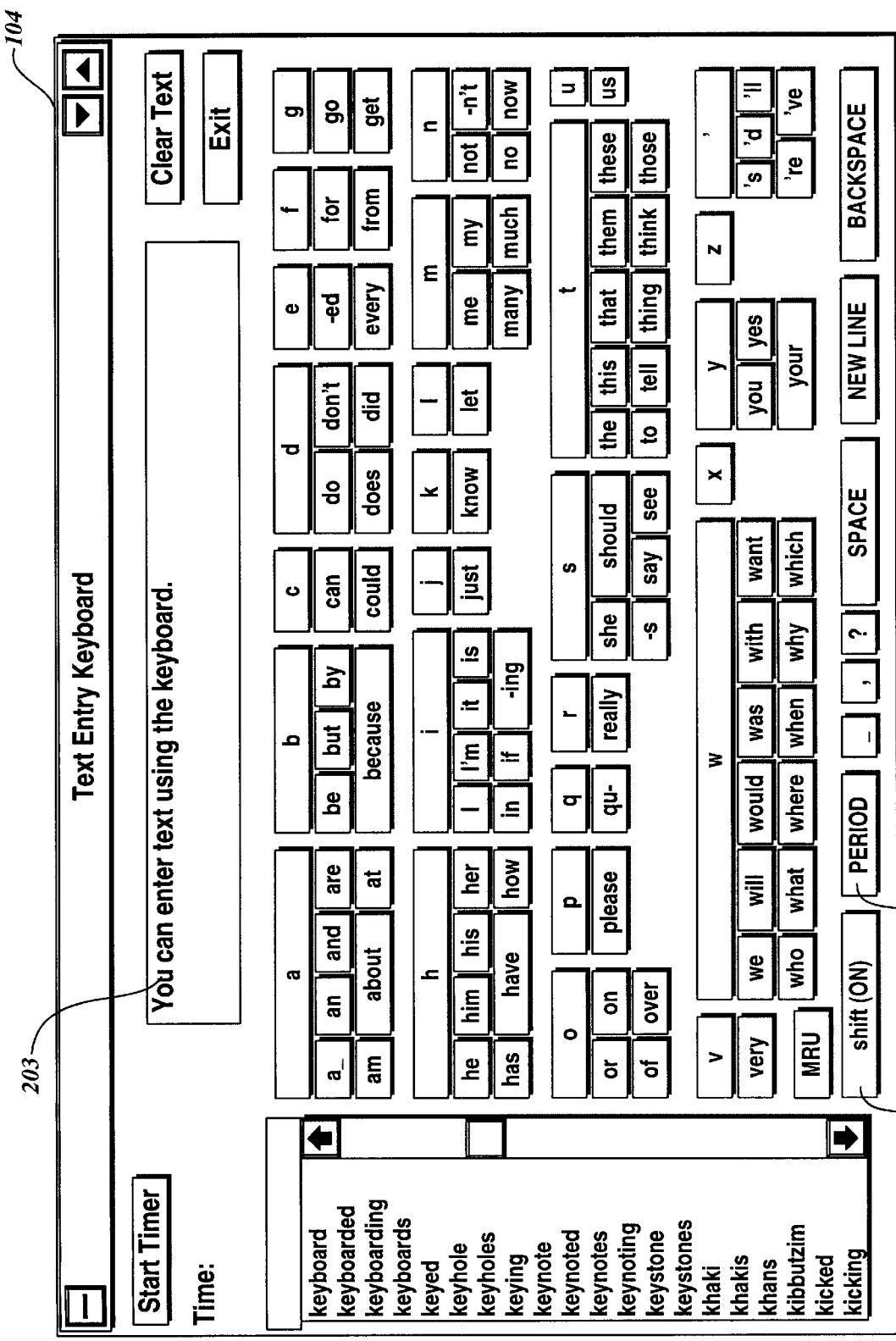
FIG. 12 illustrates a state of the preferred on-screen keyboard after the user actuates the "PERIOD" punctuation button.

Entry of the first sentence is complete after the user actuates the "PERIOD" punctuation button 215. As the document box 203 of FIG. 12 shows, a "." character along with two space characters are displayed. FIG. 12 also illustrates that the "Shift" punctuation button 215 is now turned "on". In this way, the system 100 ensures that the first character of the next new sentence is capitalized.

Figure 13:
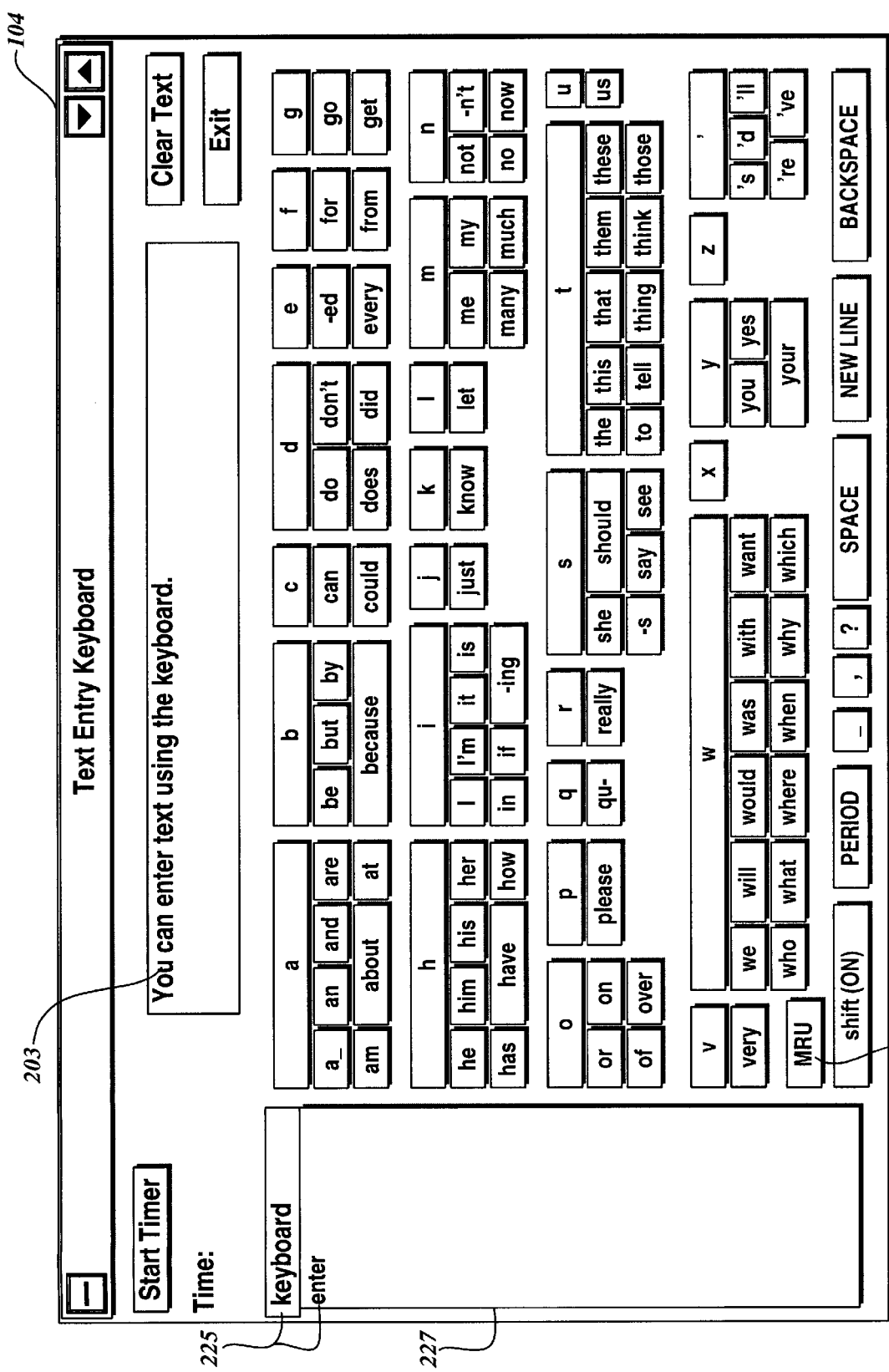
FIG. 13 illustrates a state of the preferred on-screen keyboard after the user actuates the "MRU" button.
Figure 14:
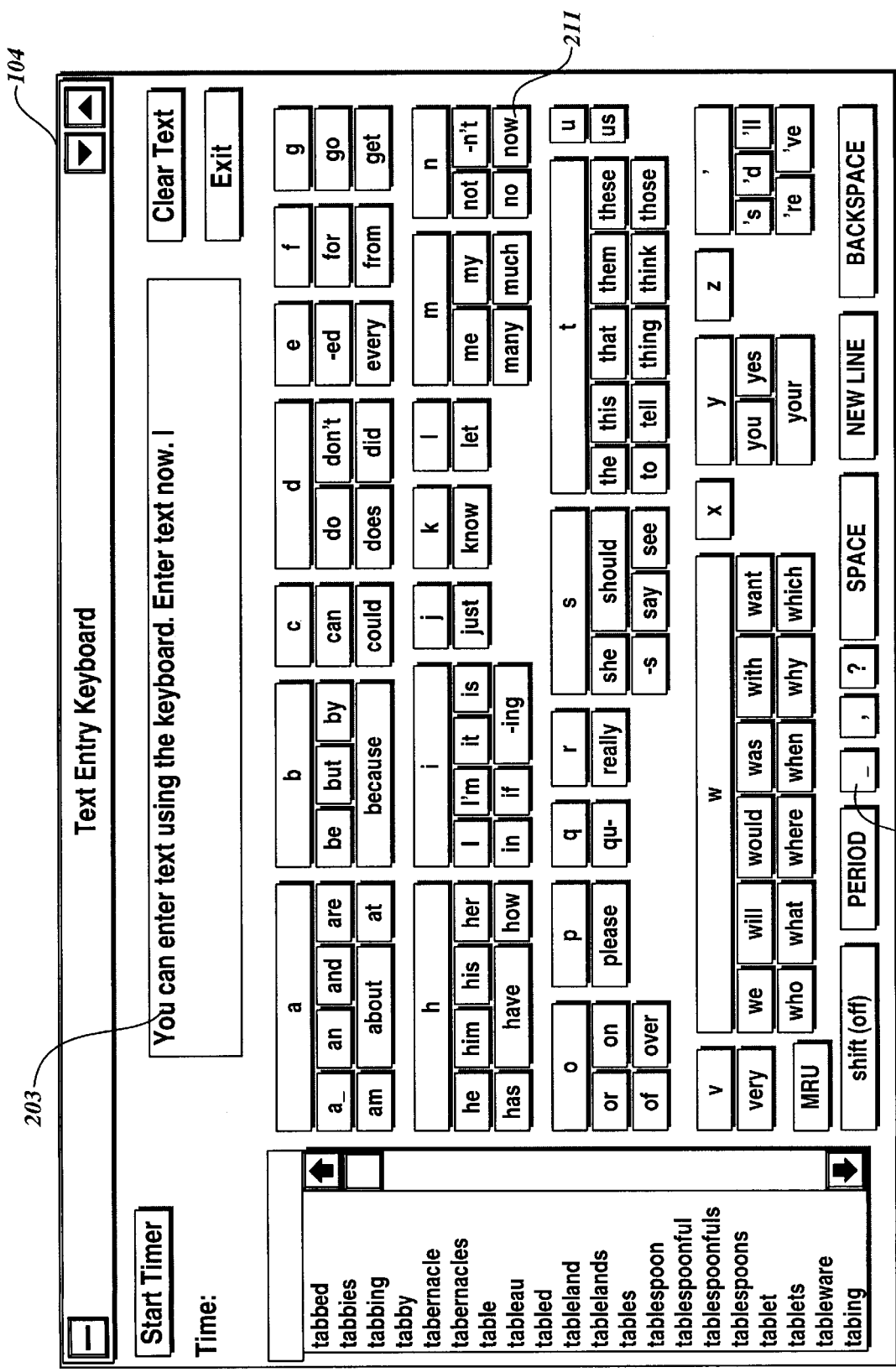
FIG. 14 illustrates a state of the preferred on-screen keyboard after the user enters the sentence "Enter text now." using the on-screen keyboards of FIGS. 2A and 2B.

The first word of the second sentence is the word "enter". The most recently used word list 119 contains the word "enter" because the user selected the word "enter" from the dictionary list box 209 while inputting the first sentence (see FIGS. 4 and 5). Therefore, the user actuates the "MRU" button 229 to display the MRU list 225 of the MRU list box 227 (FIG. 13). The user then finds and selects the word "enter" from the MRU list 225 (FIG. 14).

To complete entry of the second sentence, the user enters the character string "text" as described above (FIGS. 7 and 8); and actuates the word button 211 for the word "now" before actuating the punctuation button 215 for the period punctuation character. As FIGS. 4–14 and the corresponding discussion illustrate, the on-screen keyboard 104 provides an improved method for entering data in the computer system 100.

DETAILED DISCUSSION OF THE SYSTEM:

FIGS. 15A–24 illustrate steps of the preferred embodiment for performing operations invoked from the on-screen keyboard 104. While the steps of the preferred embodiment are discussed below as being performed by the operating system 115, those of ordinary skill in the art will understand that some of the steps can be provided as operating system resources which are used by application programs and some of the steps can be implemented in hardware.

Figure 15A:
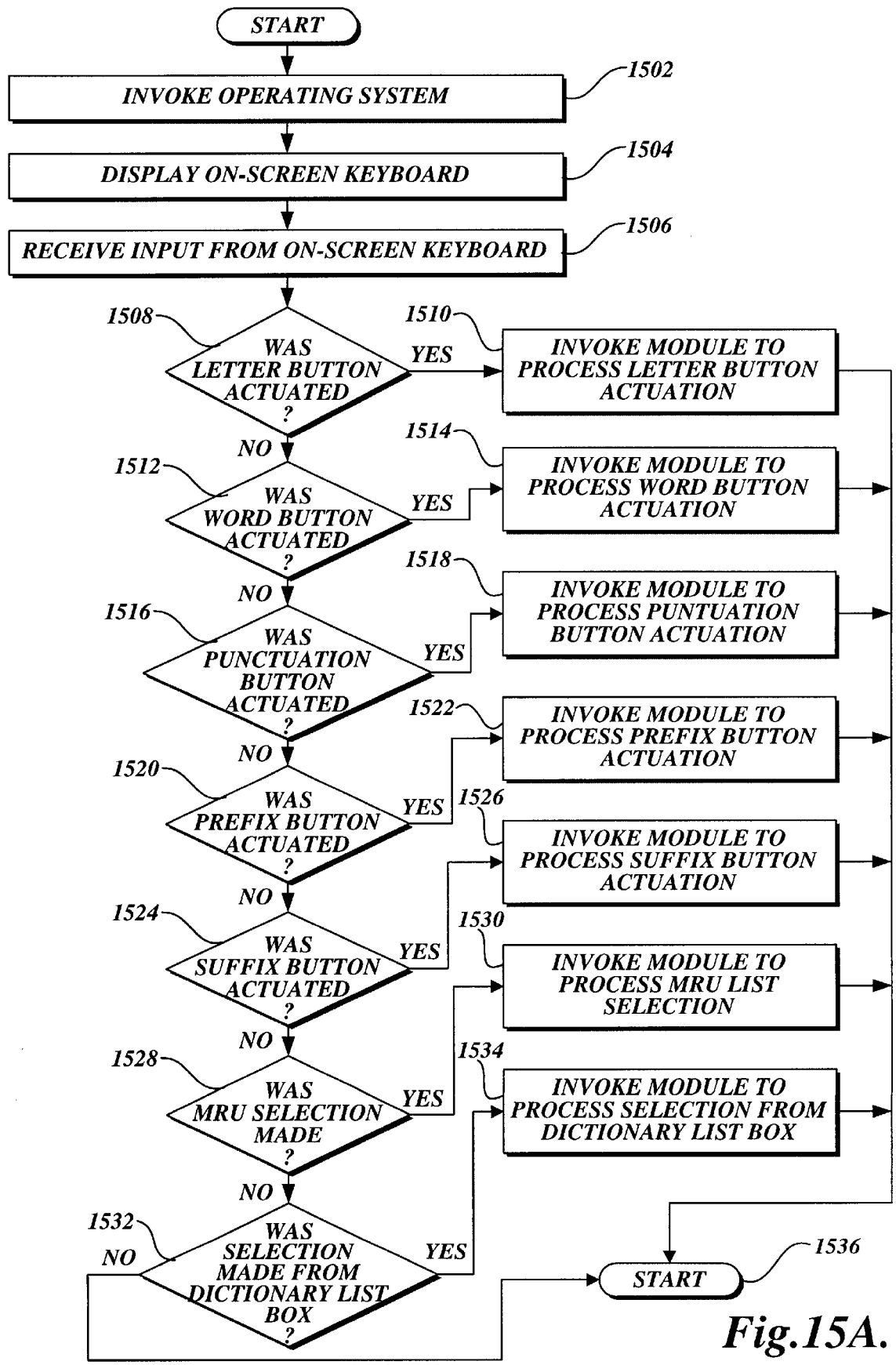
FIG. 15A is a flow diagram of a preferred module that illustrates the steps of a typical user input session.
Figure 15B:
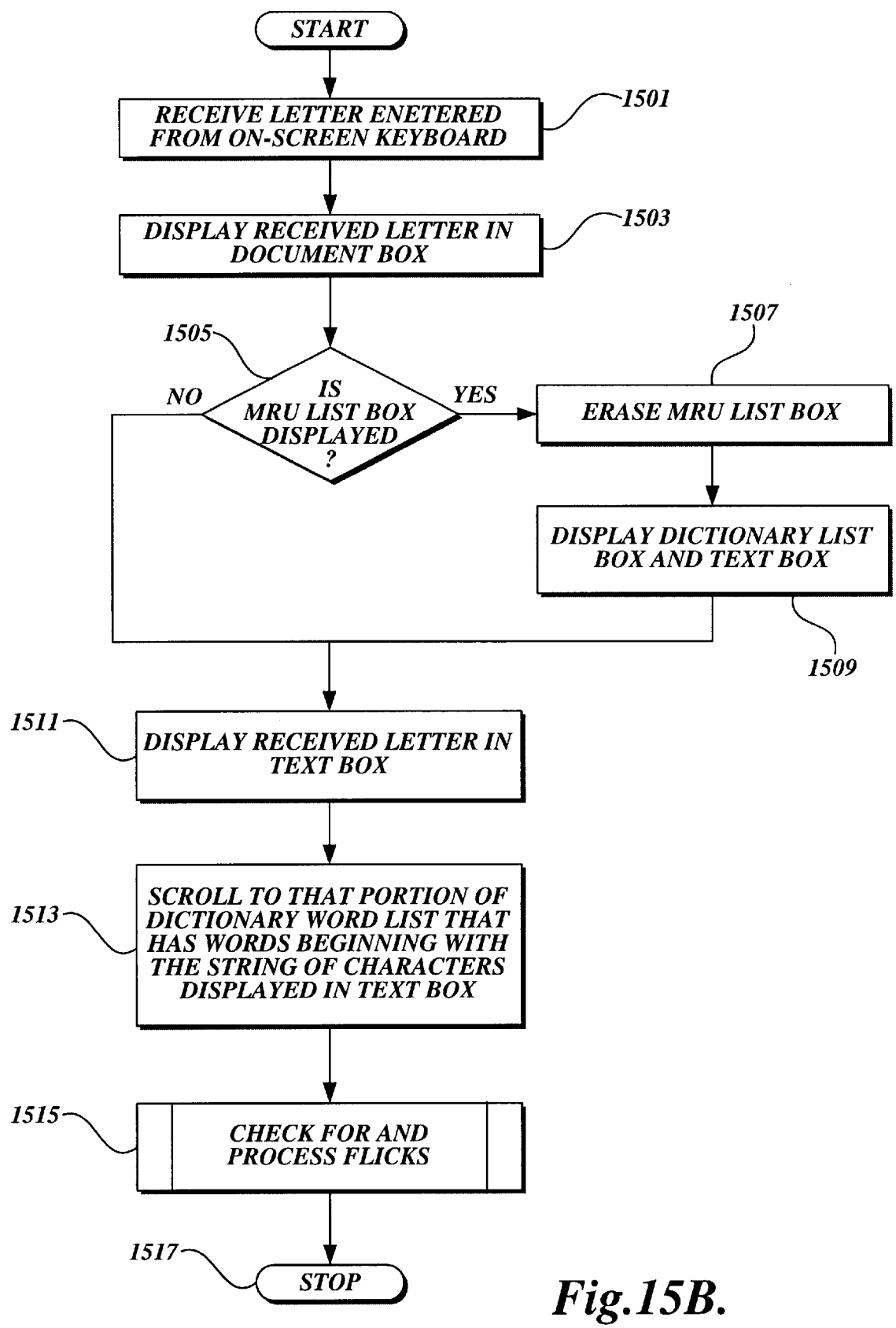
FIG. 15B is a flow diagram of a preferred module which the system invokes in response to user actuation of a letter button by the input device.

FIG. 15A is a flow diagram of a module in the operating system 115 which illustrates the steps performed during a typical user input session on the system 100. In step 1502, the user invokes the operating system 115. In step 1504, the operating system 115 displays the on-screen keyboard 104 on the video display device 103. In step 1506 the operating system 115 receives input from the on-screen keyboard 104. In steps 1508 through 1534, the module illustrated in FIG. 15A determines the type of input entered from the on-screen keyboard 104 and takes appropriate processing action. In step 1508 the operating system 115 determines whether a letter button 201 was actuated. If the letter button 201 was actuated, in step 1510 the operating system 115 invokes the module to process a letter button actuation, which is discussed in more detail below and is shown in FIG. 15B. Upon completion of step 1510 the module ends processing.

If the letter button 201 was not actuated, then the operating system 115, in step 1512, determines whether the word button 211 was actuated. If the word button 211 was actuated, then the operating system 115 invokes a module to process word button actuation, which is discussed in more detail below and is shown in FIG. 18. Upon completion of step 1514 processing ends.

In step 1516 the operating system 115 determines whether the punctuation button 215 was actuated. If the punctuation button 215 was actuated, then the operating system 115, in step 1518, invokes a module to process a punctuation button actuation. The module to process a punctuation button actuation is discussed in more detail below and is shown in FIG. 20. Upon completion of step 1518 processing ends.

In step 1520 the operating system 115 determines whether an affix button 213 corresponding to a prefix was actuated. If an affix button 213 corresponding to a prefix was actuated, then the operating system 115 invokes a module to process a prefix button actuation (step 1522). The module to process a prefix button actuation is discussed in more detail below and is shown in FIG. 22. Upon completion of step 1522 processing ends.

In step 1524 the operating system 115 determines whether an affix button 213 corresponding to a suffix was actuated. If an affix button 213 corresponding to a suffix was actuated, then the operating system 115 invokes a module to process a suffix button actuation (step 1526). The preferred steps of the module to process a suffix button actuation are discussed in more detail below and are shown in FIG. 21. Upon completion of step 1526 processing ends.

Figure 24:
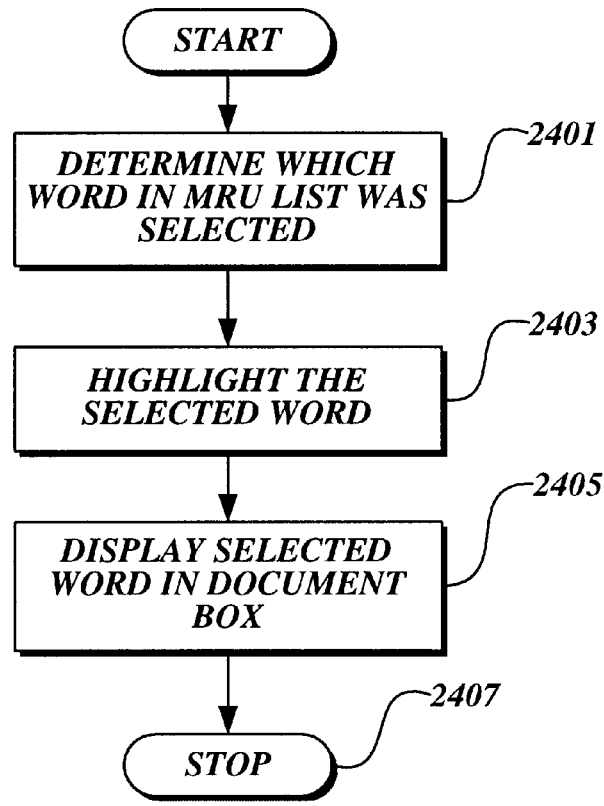
FIG. 24 is a flow diagram of a preferred module which processes a selection from the MRU list box.

In step 1528 the operating system 115 determines whether a selection was made from the MRU list box 227. If a selection was made from the MRU list box 227 then the operating system, in step 1530, invokes a module to process an MRU list selection. The steps of the preferred module to process a selection from the MRU list box are discussed in more detail below and are shown in FIG. 24. Upon completion of step 1530 processing ends.

Figure 23:
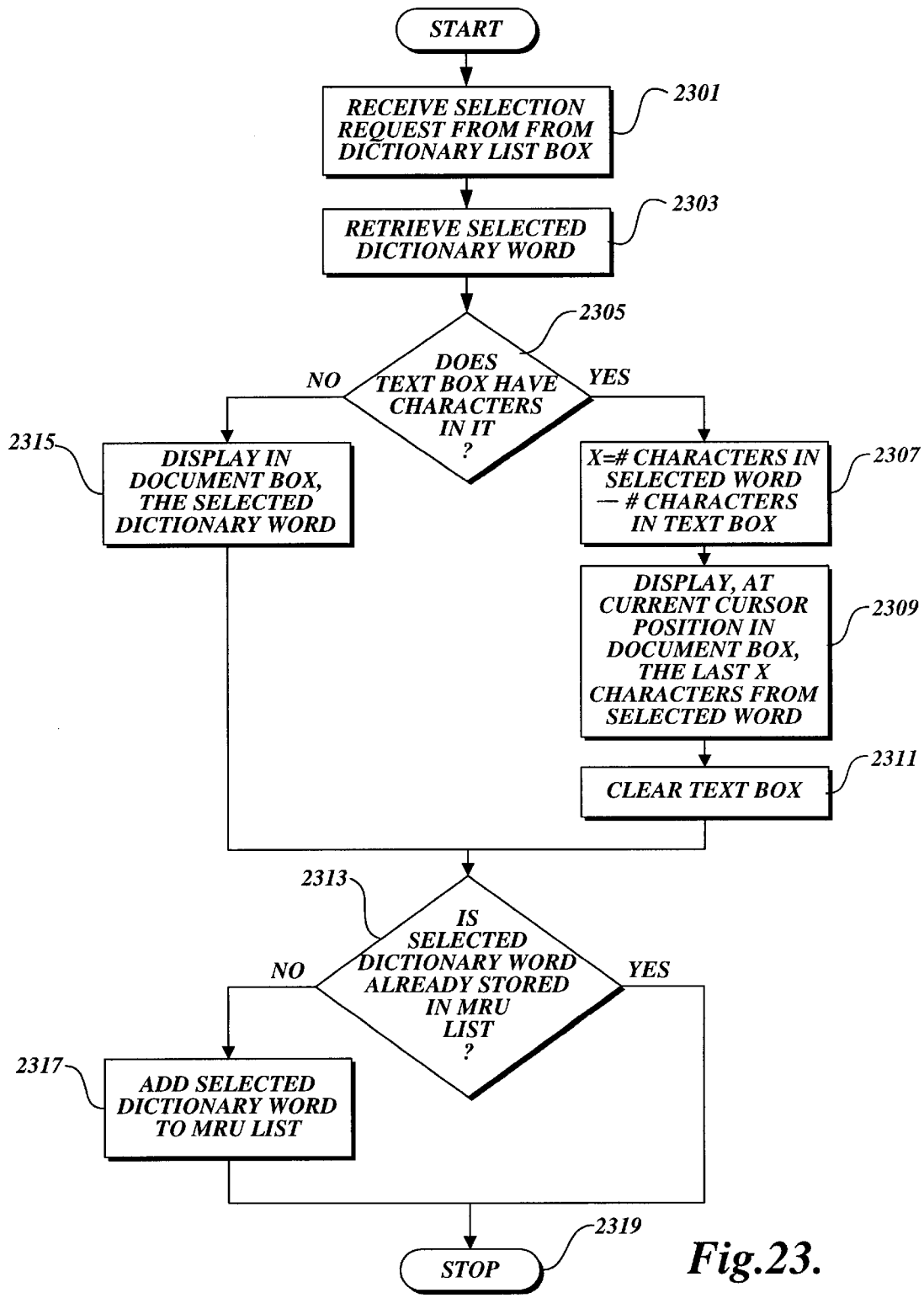
FIG. 23 is a flow diagram of a preferred module which processes a selection request from the dictionary list box.

In step 1532 the operating system 115 determines whether a selection was made from the dictionary list box 209. If a selection was made from the dictionary list box 209 then the operating system 115 invokes a module to process a selection from the dictionary list box 209 (step 1534). The steps of the preferred module for processing a selection request from the dictionary list box 209 are discussed in more detail below and are shown in FIG. 23. Upon completion of step 1534, processing ends in step 1536. If, in step 1532, the operating system 115 determines that a selection was not made from the dictionary list box 209, then processing ends.

FIG. 15B is a flow diagram of a module in the operating system 115 which responds to user actuation of the letter button 201. In response to actuation of the letter button 201 the operating system 115 receives the letter entered from the letter button 201 on the on-screen keyboard 104 (step 1501). In step 1503 the operating system 115 displays the received letter in the document box 203. In step 1505 the operating system 115 determines whether the MRU list box 227 or the dictionary list box 205 is displayed on the on-screen keyboard 104. If the dictionary list box 205 is displayed then processing continues with step 1511.

If the MRU list box 227 is displayed on the on-screen keyboard 104, then the operating system 115 erases the MRU list box in step 1507 and displays the dictionary list box 209 along with the text box 205. Upon completion of step 1509, processing continues with step 1511.

In step 1511 the operating system 115 displays the received letter in the text box 205. In step 1513, the operating system 115 scrolls to that portion of the dictionary word list 117 that has words beginning with the string of characters displayed in the text box 205.

Figure 16:
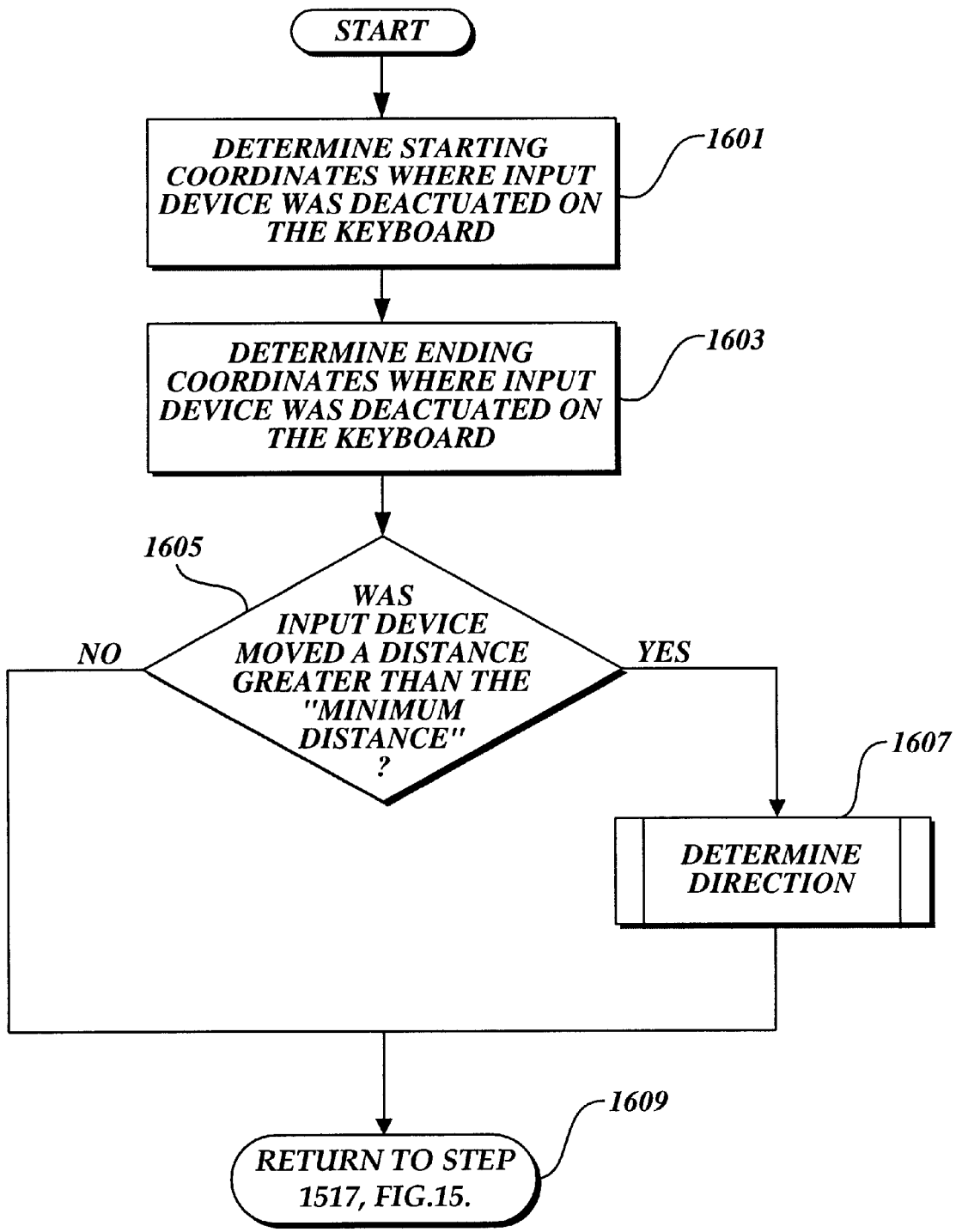
FIG. 16 is a flow diagram of a preferred module which checks for and processes flicks.

In step 1515, the system 100 checks for and processes flicks. If a flick is detected then an appropriate vowel character is displayed in both the document box 203 and the text box 205. In addition, the dictionary words 117 displayed in the dictionary list box 209 are automatically scrolled to that portion of the list that begins with the string of characters displayed in the text box 205. The preferred method for detecting and processing flicks is discussed in more detail below and is shown in FIG. 16. Upon completion of step 1515, the module for processing a letter button actuation ends processing.

Figure 17:
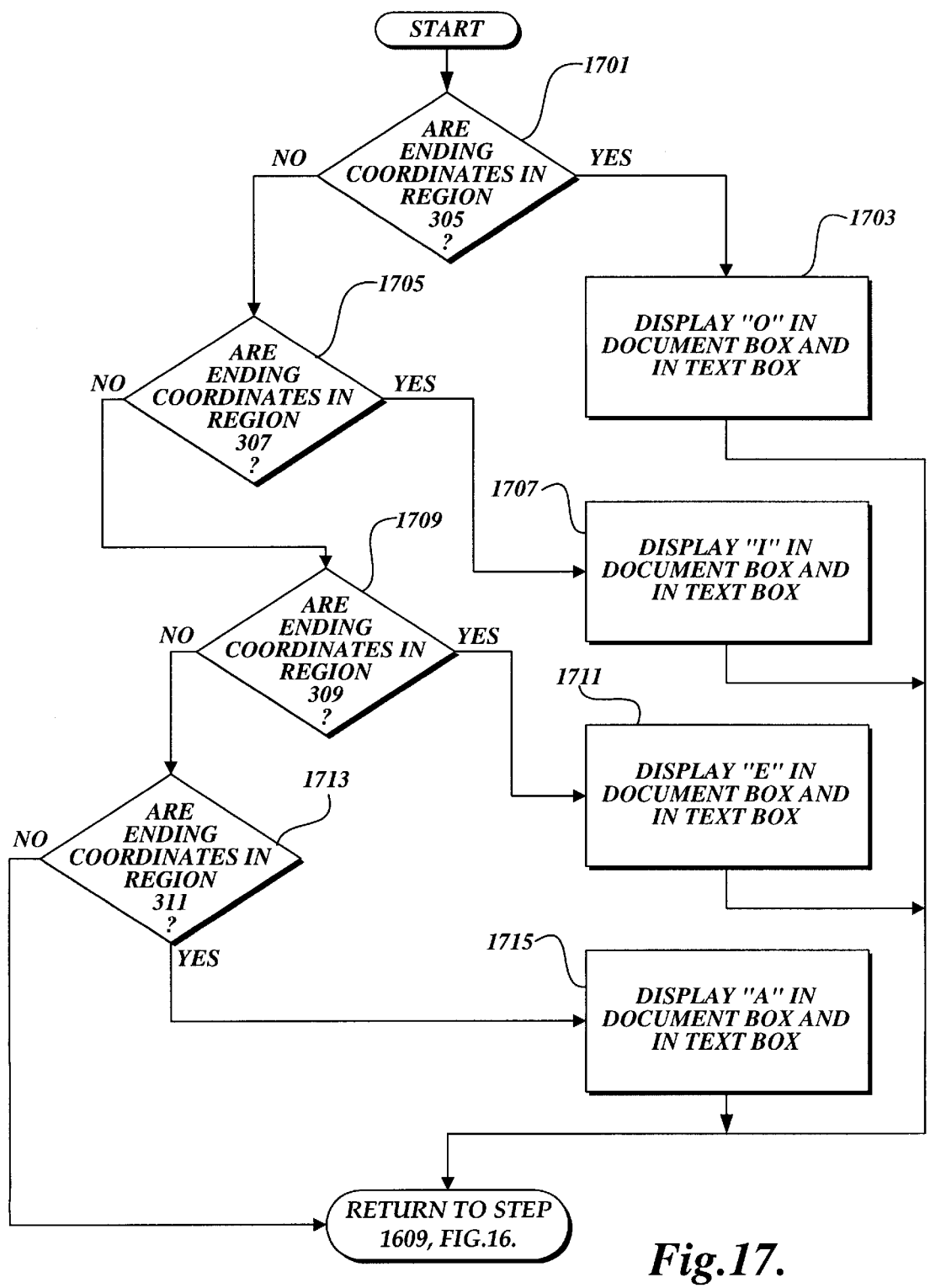
FIG. 17 is a flow diagram of a preferred module which determines a direction that the input device was flicked so that an appropriate vowel can be displayed on the on-screen keyboard.

FIG. 16 is a flow diagram of the preferred method for detecting and processing flicks. In step 1601, the operating system 115 determines the starting coordinates on the on-screen keyboard 104 where the input device 105 was actuated. In step 1603, the operating system 115 determines the ending coordinates on the on-screen keyboard 104 where the input device 105 stopped being actuated. In step 1605, using the starting coordinates and the ending coordinates, an application program 123 in the memory 111 determines whether the input device 105 was moved a distance greater than a "minimum distance." The "minimum distance" is a system variable which can be set by a developer of the application program 123 to any arbitrary distance. Preferably, the minimum distance is sufficient to ensure that the input device 105 has been moved outside the border 301 (FIG. 3) of the button. If the input device 105 was moved a distance less than the "minimum distance" then processing returns to step 1517 in FIG. 15. However, if the input device was moved a distance greater than the "minimum distance" then a module of the application program 123 is invoked to determine a direction in which the input device 105 was moved. The directional movement of the input device 105 determines which vowel character the operating system 115 displays in the document box 203 and the text box 205. The module which determines the directional movement of the input device 105 is discussed in more detail below and is shown in FIG. 17. Upon completion of step 1607, processing returns to step 1517 in FIG. 15B.

FIG. 17 is a flow diagram of a module in the operating system 115 which determines a direction in which the input device 105 was flicked so that the appropriate vowel can be displayed. If the ending coordinates of the input device 105 are in region 305 (FIG. 3) then the operating system 115 displays the vowel "o" in the document box 203 and the text box 205 and scrolls the dictionary words 117 displayed in the dictionary list box 209 to that portion of the list that begins with the string of characters displayed in the text box 205 (steps 1701 and 1703). If the ending coordinates of the input device 105 are in region 307 (FIG. 3) then the operating system 115 displays the vowel "i" in the document box 203 and the text box 205 and scrolls the dictionary words 117 displayed in the dictionary list box 209 to that portion of the list that begins with the string of characters displayed in the text box 205 (steps 1705 and 1707). If the ending coordinates of the input device 105 are in region 309 (FIG. 3) then the operating system 115 displays the vowel "e" in the document box 203 and the text box 205 and scrolls the dictionary words 117 displayed in the dictionary list box 209 to that portion of the list that begins with the string of characters displayed in the text box 205 (steps 1709 and 1711). If the ending coordinates of the input device 105 are in region 311 (FIG. 3) then the operating system 115 displays the vowel "a" in the document box 203 and the text box 205 and scrolls the dictionary words 117 displayed in the dictionary list box 209 to that portion of the list that begins with the string of characters displayed in the text box 205 (step 1713).

After the operating system 115 displays the appropriate vowel in either steps 1703, 1707, 1711, or 1715, processing returns to step 1609 in FIG. 16 which itself returns to FIG. 15 which ends processing of the module to process a letter button actuation.

FIG. 18 is a flow diagram of a module in the operating system 115 which processes an actuation of the word button 211 from the on-screen keyboard 104. In step 1801 the operating system 115 receives the word entered by actuation of the word button 211. In step 1803 the operating system 115 determines whether the "Shift" punctuation button 215 is "on". If the operating system 115 determines that the "Shift" punctuation button 215 is "on" then in step 1805 the operating system 115 capitalizes the first character of the received word. Upon completion of step 1805 or if the operating system 115 determines that the "Shift" punctuation button 215 is "off" (step 1803) then processing continues with step 1807.

In step 1807 the operating system 115 displays the received word, followed by a space character in the document box 203. In step 1809 the operating system 115 invokes a module which determines whether the user has performed a double-tap operation on the word button 211. If the user has performed a double-tap operation then the operating system 115 displays the word "the" followed by a space character in the document box 203.

FIG. 19 is a flow diagram of a module in the operating system 115 which determines whether the user has performed a double-tap operation on the word button 211 of the on-screen keyboard 104. In step 1901 the operating system 115 determines whether the word button 211 was actuated twice in a time period less than a "threshold time period". The threshold time period is a system variable which can be set by the developer of the operating system 115 to any arbitrary time period. If the user actuates the word button 211 twice in a time period less than the threshold time period then, in step 1903, the operating system 115 displays the word "the" followed by a space character in the document box 203. Upon completion of step 1903 or upon a determination in step 1901 that the user did not actuate the word button 211 in a time period less than the threshold time period, processing returns to FIG. 18.

In step 1811 the operating system 115 clears the text box 205. Upon completion of step 1811 processing stops.

FIG. 20 is a flow diagram of a module in the operating system 115 which processes an actuation of one of the punctuation buttons 215. In step 2001 the operating system 115 receives the punctuation character entered by actuation of the punctuation button 215. In step 2003 the operating system 115 determines whether a space character is the last character entered in the document box 203. If the space character is the last character entered in the document box 203 then in step 2005 the operating system 115 deletes the space character. Upon completion of 2005 or if the last character entered in the document box 203 is not a space character, then processing continues with step 2007.

In step 2007 the operating system 115 displays the appropriate punctuation character, corresponding to the actuated punctuation button 215, in the document box 203. For example, if the "PERIOD" punctuation button 215 or a "?" punctuation button 215 is actuated, then the operating system 115 displays a "." or a "?" followed by two space characters. In addition, the operating system 115 actuates the "Shift" punctuation button 215 into the "on" mode. If the user actuates the "," punctuation button 215 then the operating system 115 displays the punctuation character "," followed by a space character. If the user actuates the "." punctuation button 215 then the operating system 115 displays the punctuation character ".". In step 2009 the operating system 115 clears the text box 205. While the preferred embodiment implements the punctuation characters discussed above, those of ordinary skill will understand that other punctuation characters can be implemented in a similar manner. Upon completion of step 2009, processing ends.

FIG. 21 is a flow diagram of a module in the operating system 115 which processes actuation of the suffix buttons 213. In step 2101 the operating system 115 receives a suffix character string entered from one of the suffix buttons 213. If the operating system 115 determines, in step 2103, that the document box 203 is empty, then in step 2105 it displays in the document box 203 the suffix associated with the actuated suffix button 213. Upon completion of step 2105, processing continues with step 2107.

Returning to the discussion of step 2103, if the operating system 115 determines that the document box 203 is not empty, then in step 2109 it determines whether a space character was the last character entered in the document box 203. If a space character was the last character entered in the document box then in step 2111 the operating system 115 deletes the space character from the document box 203. Upon completion of step 2111, or if the operating system 115 determines that the last character entered in the document box was not a space character (step 2109) then processing continues with step 2113.

In step 2113 the operating system 115 displays the received character string, followed by a space character, in the document box 203. Upon completion of step 2113 processing continues with step 2107 where the operating system 115 invokes the module to determine whether the user has performed a double-tap on the suffix button 213 (discussed above and shown in FIG. 19). Upon completion of step 2107, the operating system 115, in step 2115, clears the text box 205. Upon completion of step 2115 the module to process actuation of the suffix button 213 ends processing.

FIG. 22 is a flow diagram of a module in the operating system 115 which performs processing after an actuation of one of the prefix buttons 213. In step 2201 the operating system 115 receives the prefix character string entered by actuation of the prefix button 213 on the on-screen keyboard 104. In step 2203 the operating system 115 displays the received prefix in the document box 203. In step 2205 the operating system 115 displays the received prefix in the text box 205. Upon completion of step 2205, the module for processing an actuation of one of the prefix buttons 213 ends processing.

FIG. 23 is a flow diagram of a module in the operating system 115 which processes a selection request from the dictionary list box 209. In step 2301 the operating system 115 receives the selection request entered in the dictionary list box 209. In step 2303 the operating system 115 retrieves the selected word from the dictionary word list 117 in the memory 111 of the computer 101. In step 2305 the operating system 115 determines whether the text box 205 currently displays any characters. If the text box 205 is not empty then in step 2307 the operating system 115 sets a variable "x" equal to the number of characters in the selected word minus the number of characters currently displayed in the text box 205. In step 2309 the operating system 115 displays the last "x" characters from the selected word in the document box 203. In short, the difference between the selected word and the character string currently displayed in the text box 205 is all that needs to be added to the document box 203. In step 2311 the operating system clears the text box 205. Upon completion of step 2311 processing continues with step 2313.

Returning to the discussion of step 2305, if the text box 205 is empty, then the operating system 115, in step 2315, displays the selected word in the document box 203. Upon completion of step 2315 processing continues with step 2313.

In step 2313 the operating system 115 determines whether the selected word is already stored in the MRU list 119 of the memory 111. If the MRU list 119 does not contain the selected word then in step 2317 the operating system 115 adds the selected word to the MRU list 119. If the MRU list 119 does contain the selected word then the operating system 115 moves the selected word to the top of the MRU list. Upon completion of step 2317 or step 2318, processing ends.

FIG. 24 is a flow diagram of a module in the operating system 115 which processes a selection from the MRU list box 227. In step 2401 the operating system 115 determines which word in the MRU list was selected by the user. In step 2403 the operating system 115 highlights the selected word in the MRU list box 227. In step 2405 the operating system 115 displays the selected word in the document box 203. Upon completion of step 2405 the module to process a selection from the MRU list box ends processing.

Additional advantages and modifications will readily occur to those skilled in the art. Therefore, the invention in its broader aspects is not limited to the specific details, and representative devices, shown and described herein. Accordingly, various modifications may be made without departing from the spirit and scope of the general inventive concept as defined by the appended claims and their equivalents.

For example, the steps of the preferred embodiment for performing operations from the on-screen keyboard 104 have been discussed above as being performed by the operating system 115. Those of ordinary skill in the art will understand that the steps can be provided as an operating system resource which is then used by an application program. Similarly, the steps can be implemented in hardware.

While the preferred embodiment has been described as displaying text input from the on-screen keyboard in a document box, those of ordinary skill will understand that the entered text can be output to components other than the document box of the on-screen keyboard. For example, if a word processing document is active in the computer system then text entered via the on-screen keyboard could be output to the word processing document instead of, or in addition to, the document box. In this way text can be displayed on a multitude of different input displays using the improved on-screen keyboard of the present invention.

I claim:

1. In a computer system having a pointing device and a video display, an on-screen keyboard that is displayed on the video display, comprising:
   (a) an actuatable letter button for inputting a fixed letter that is associated with the letter button when actuated by the pointing device; and
   (b) a flick detector for detecting a flick by the pointing device when actuating the letter button, wherein the flick constitutes actuating the letter button and dragging the pointing device from the letter button in a direction, and for inputting an additional letter in response to the detection of the flick.

2. An on-screen keyboard as recited in claim 1, further comprising a transferor for transferring characters that are input via the on-screen keyboard to an input display.

3. The on-screen keyboard of claim 1, wherein the additional letter that is input in response to detection of the flick is a vowel.

4. The on-screen keyboard of claim 1, wherein the flick detector further comprises a direction detector for detecting a direction of the flick from a set of possible directions, associating at least one letter with each direction and in response to the detected direction of the flick, inputting the associated at least one letter.

5. The on-screen keyboard of claim 4, wherein each direction is associated with a different vowel.

6. The on-screen keyboard of claim 1, further comprising:
   (a) a scroll box that displays an alphabetized list of words that may be input;
   (b) a scroller, responsive to actuation of the letter button and the flick detector, for displaying a portion of the list of words that begins with the input letters; and
   (c) a scroll box selector for selecting one of the words displayed in the scroll box and for inputting the selected word.

7. In a computer system having a pointing device and a video display, an on-screen keyboard that is displayed on the video display, comprising:

(a) an actuatable punctuation character button for inputting an associated punctuation character to an input display in response to actuation of the punctuation character button by the pointing device;

(b) an identifier, responsive to the actuation of the punctuation character button, for identifying that a space character occupies a last input character position of the input display;

(c) an eraser, responsive to identifying that the space character occupies the last input character position of the input display, for deleting the space character from the last input character position of the input display;

(d) an inserter for inserting the associated punctuation character in the last input character position of the input display when the space character is deleted; and (e) a flick detector for detecting a flick by the pointing, device when actuating a letter button to input a letter character associated with the letter button and for inputting an additional letter character in response to the detection of the flick, wherein the flick constitutes actuating the letter button and drawing the pointing device from the letter button in a direction.

8. In a computer system having a pointing device and a video display, an on-screen English keyboard that is displayed on the video display, comprising:

(a) at least one actuatable affix character button, said button inputting an associated affix English character string to an input display when actuated by the pointing device;

(b) an identifier, responsive to the actuation of the affix character button, for identifying that a space character occupies a last character position in the input display;

(c) an eraser, responsive to identifying that the space character occupies the last character position, for deleting the space character;

(d) an inserter for inserting the associated affix character string in the last character position of the input display when the space character is deleted; and (e) a flick detector for detecting a flick by the pointing device when actuating a letter button to input a letter character associated with the letter button and for inputting an additional letter character in response to the detection of the flick, wherein the flick constitutes actuating the letter button and dragging the pointing device from the letter button in a direction.

9. A method executed in a computer system for entering text from an on-screen keyboard displayed on a display device of the computer system, the computer system including a pointer positioning device for entering text using the on-screen keyboard, and an actuatable word button for inputting an associated word when actuated by the pointer positioning device, wherein the associated word is an English-language symbol comprising two or more characters, the method comprising:

(a) providing an actuatable letter button, the letter button inputting an associated letter when actuated by a pointer positioning device; and (a) detecting a flick by the pointer positioning device when actuating the letter button, wherein said flick constitutes a movement by the pointer positioning device away from the letter button when activating the letter button, and inputting a vowel in response to the flick.

10. The method of claim 9, further comprising the steps of:

(a) providing a scroll box that displays an alphabetized list of words on the display device; and (b) in response to detecting the flick, displaying in the scroll box that portion of the list of words that begin with the associated letter followed by the vowel.

11. A method executed in a computer system for entering characters from an on-screen keyboard displayed on a display device of the computer system, the computer system including a pointer positioning device for entering characters using, the on-screen keyboard, comprising:

(a) providing an actuatable punctuation character button, the punctuation character button inputting an associated punctuation character to an input display when actuated by the pointer positioning device;

(b) in response to actuation of the punctuation character button, identifying that a space character occupies a last character position on the input display;

(c) in response to identifying that the space character occupies the last character position on the input display, deleting the space character;

(d) inserting the associated punctuation character on the input display in response to the deletion of the space character; and (e) detecting a flick by the pointer positioning device when actuating a letter button to input a letter character associated with the letter button and inputting an additional letter character in response to the flick, wherein the flick constitutes a movement by the pointer positioning device away from the letter button when actuating the letter button.

12. A method executed in a computer system for entering characters from an on-screen keyboard displayed on a display device of the computer system, the computer system including a pointer positioning device for entering characters using the on-screen keyboard, the method comprising:

(a) providing a document box for displaying characters;

(b) providing an affix character button having an associated affix character string;

(c) detecting an actuation of the affix character button by the pointer positioning device;

(d) in response to detecting the actuation of the affix character button, identifying that a space character is the last character displayed in the document box;

(e) in response to identifying that the space character was the last character displayed in the document box, deleting the space character;

(f) inserting the associated affix character string in the document box in response to the deletion of the space character; and (g) detecting a flick by the pointer positioning device when actuating a letter button to input a letter character associated with the letter button and inputting an additional letter character in response to the flick, wherein the flick constitutes a movement by the pointer positioning device away from the letter button when actuating the letter button.

13. A computer-readable storage device containing instructions for controlling a computer system to provide a method for entering text from an on-screen keyboard displayed on a display device of the computer system, the computer system including a pointer positioning device for entering text using the on-screen keyboard, and an actuatable word button for inputting a word associated with the word button when actuated by the pointer positioning device, wherein the associated word is an English-language symbol comprising two or more characters, the method comprising:

(a) providing an actuatable letter button, the letter button inputting an associated letter character when actuated by a pointer positioning device; and (b) detecting a flick by the pointer positioning device when actuating the letter button, wherein said flick constitutes a movement by the pointer positioning device away from the letter button when actuating the letter button, and inputting an associated vowel character in response to the flick.

14. The computer-readable storage device of claim 13, further comprising:

(a) providing a scroll box that displays an alphabetized list of words on the display device; and (b) in response to detecting the flick, displaying in the scroll box that portion of the list of words that begin with the associated letter character followed by the associated vowel character.

15. A computer-readable storage device containing instructions for controlling a computer system to provide a method for entering characters from an on-screen keyboard displayed on a display device of the computer system, the computer system including a pointer positioning device for entering characters using the on-screen keyboard, comprising:

(a) providing an actuatable punctuation character button, the punctuation character button inputting an associated punctuation character to an input display when actuated by the pointer positioning device;

(b) in response to actuation of the punctuation character button, identifying that a space character occupies a last character position on the input display;

(c) in response to identifying that the space character occupies the last character position on the input display, deleting the space character;

(d) inserting the associated punctuation character on the input display in response to the deletion of the space character; and (e) detecting a flick by the pointer positioning device when actuating a letter button to input a letter character associated with the letter button and inputting an additional letter character in response to the flick, wherein the flick constitutes a movement by the pointer positioning device away from the letter button when actuating the letter button.

16. A computer-readable storage device containing instructions for controlling a computer system to provide to a method for entering characters from an on-screen keyboard displayed on a display device of the computer system, the computer system including a pointer positioning device for entering characters using the on-screen keyboard, the method comprising:

(a) providing a document box for displaying characters;

(b) providing an affix character button having an associated affix character string;

(c) detecting an actuation of the affix character button by the pointer positioning device;

(d) in response to detecting the actuation of the affix character button, identifying that a space character is the last character displayed in the document box;

(e) in response to identifying that the space character was the last character displayed in the document box, deleting the space character;

(f) inserting the associated affix character string in the document box after deleting the space character; and (g) detecting a flick by the pointer positioning device when actuating a letter button to input a letter character associated with the letter button and inputting an additional letter character in response to the flick, wherein the flick constitutes a movement by the pointer positioning device away from the letter button when actuating the letter button.

17. In a computer system having a pointing device and a video display, an English on-screen keyboard for the entry of a text string into an input display of a computer program, the on-screen keyboard being shown on the video display, the text string represented in a computer memory as series of computer-readable codes with each code representing a text character, comprising:

(a) a plurality of actuatable word buttons, each word button being associated with a word and corresponding to a text element of the English language having at least two characters, the plurality of word buttons being grouped alphabetically by the word associated with each word button; and (b) a transferor for transferring the word to an input display in response to an actuation of an individual word button as part of the text string; and (c) a flick detector for detecting a flick by the pointing device when actuating a letter button to input a letter character associated with the letter button and for inputting an additional letter character in response to the detection of the flick, wherein the flick constitutes actuating the letter button and drawing the pointing device from the letter button in a direction.

18. The on-screen keyboard of claim 17, further comprising:

(a) a plurality of actuatable letter buttons, each letter button being grouped alphabetically with the plurality of word buttons according to the letter character associated with each letter button and the word associated with each word button; and (b) wherein the transferor transfers the letter character to the input display in response to an actuation of an individual letter button by the pointing device.

19. The on-screen keyboard of claim 18 further comprising:

(a) a dictionary list box that displays a dictionary of words; and (b) wherein the transferor transfers to the input display a dictionary word that is selected by the pointing device from the dictionary of words displayed in the dictionary list box.

20. The on-screen keyboard of claim 19, wherein the dictionary of words that appears in the dictionary list box is responsive to the alphabetical order of each letter character that is transferred to the input display.

21. The on-screen keyboard of claim 19, further comprising:

(a) another dictionary list box containing a list of the dictionary words that were most recently transferred to the input display when selected by the pointing device; and (b) wherein the transferor transfers to the input display another dictionary word that is selected by the pointing device from the list of the dictionary words displayed in the other dictionary list box.

22. The on-screen keyboard of claim 17, further comprising:

(a) a double tap detector for detecting double taps on the word button using the pointing device; and (b) wherein the transferor transfers an additional word to the input display when a double tap is detected.

23. The on-screen keyboard of claim 22, wherein the additional word is the word "the".

24. The on-screen keyboard of claim 17, further comprising:

(a) an actuatable punctuation character button for inputting an associated punctuation character when the punctuation character button is actuated through the pointing device;

(b) an identifier, responsive to the actuation of the punctuation character button, for identifying that a space character occupies a last input character position of the input display;

(c) an eraser, responsive to identifying that the space character occupies the last input character position in the input display, for deleting the space character from the last input character position; and (d) an inserter for inserting the associated punctuation character in the last input character position of the input display when the space character is deleted.

25. In a computer system having a pointing device and a video display, an English on-screen keyboard for the entry of a text string into an input display of a computer program, the English on-screen keyboard being shown on the video display, comprising:

(a) a plurality of actuatable word buttons, each word button being associated with a word comprising a text element of the English language having at least two characters;

(b) a dictionary list box that displays a list of dictionary words;

(c) a selector for selecting a dictionary word with the pointing device from the list of dictionary words;

(d) a transferor for transferring the word from an actuated word button to the input display as part of the text string and transferring the dictionary word that is selected by the selector from the list of dictionary words displayed in the dictionary list box to the input display as part of the text string; and (e) a flick detector for detecting a flick by the pointing device when actuating a letter button to input a letter character associated with the letter button and for inputting an additional letter character in response to the detection of the flick, wherein the flick constitutes actuating the letter button and dragging the pointing device from the letter button in a direction.

26. The on-screen keyboard of claim 25, wherein the dictionary of words that appears in the dictionary list box is responsive to the alphabetical order of each dictionary word transferred to the input display.

27. The on-screen keyboard of claim 25, further comprising (a) another dictionary list box containing another list of dictionary words that were most recently transferred to the input display when selected by the pointing device; and (b) wherein the transferor transfers to the input display another dictionary word that is selected by the pointing device from the other list of dictionary words displayed in the other dictionary list box.

28. The on-screen keyboard of claim 25, further comprising (a) a plurality of letter buttons that are grouped alphabetically with the plurality of word buttons according to the letter character associated with each letter button and the word associated with each word button; and (b) wherein the transferor transfers the letter character to an input display in response to an actuation of an individual letter button by the pointing device.

29. The on-screen keyboard of claim 25, further comprising:

(a) a double tap detector for detecting double taps on the word button using the pointing device; and (b) wherein the transferor transfers to the input display an additional word when a double tap is detected.

30. The on-screen keyboard of claim 29, wherein the additional word is the word "the".

31. The on-screen keyboard of claim 25, further comprising:

(a) an actuatable punctuation character button for inputting an associated punctuation character when the punctuation character button is actuated through the pointing device;

(b) an identifier, responsive to the actuation of the punctuation character button, for identifying that a space character occupies a last input character position of the input display;

(c) an eraser, responsive to identifying that the space character occupies the last input character position in the input display, for deleting the space character from the last input character position; and (d) an inserter for inserting the associated punctuation character in the last input character position of the input display when the space character is deleted.

32. In a computer system having a pointing device and a video display, an English on-screen keyboard for the entry of a text string into an input display of a computer program, the English on-screen keyboard being shown on the video display, comprising:

(a) a plurality of actuatable word buttons, each of said actuatable word buttons being associated with a word that includes a text element of the English language having at least two characters;

(b) a list box containing a list of the dictionary words that were most recently transferred to the input display when selected by the pointing device;

(c) a selector for selecting a dictionary word with the pointing device from the list of dictionary words;

(d) a transferor for transferring to the input display the dictionary word that is selected by the selector from the dictionary of words displayed in the list box to the input display as part of the text string; and (e) a flick detector for detecting a flick by the pointing device when actuating a letter button to input a letter character associated with the letter button and for inputting an additional letter character in response to the detection of the flick, wherein the flick constitutes actuating the letter button and dragging the pointing device from the letter button in a direction.

* * * * *

UNITED STATES PATENT AND TRADEMARK OFFICE
CERTIFICATE OF CORRECTION

PATENT NO. : 6,008,799
DATED : December 28, 1999
INVENTOR(S) : M. Van Kleeck

It is certified that error appears in the above-identified patent and that said Letters Patent is hereby corrected as shown below:

Title page, Page 2,
Item [56], References Cited (Other Publications), "Application" should read
-- Application --

Column 13,
Line 19, after "pointing" delete -- , --

Column 13,
Line 62, "(a)" should read -- (b) --

Signed and Sealed this

Eleventh Day of September, 2001

Attest:

NICHOLAS P. GODICI
*Attesting Officer*      *Acting Director of the United States Patent and Trademark Office*